United States Patent
Chen et al.

(10) Patent No.: US 12,526,716 B2
(45) Date of Patent: Jan. 13, 2026

(54) METHOD AND DEVICE FOR REPORTING BEAM FAILURE RECOVERY INFORMATION

(71) Applicant: APOGEE NETWORKS, LLC, Dallas, TX (US)

(72) Inventors: Yu Chen, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 300 days.

(21) Appl. No.: 18/198,851

(22) Filed: May 18, 2023

(65) Prior Publication Data

US 2023/0292212 A1    Sep. 14, 2023

Related U.S. Application Data

(63) Continuation of application No. PCT/CN2022/113217, filed on Aug. 18, 2022.

(30) Foreign Application Priority Data

Aug. 24, 2021    (CN) .......................... 202110973336.6

(51) Int. Cl.
*H04W 36/30* (2009.01)
*H04W 72/54* (2023.01)

(52) U.S. Cl.
CPC .......... *H04W 36/305* (2018.08); *H04W 72/54* (2023.01)

(58) Field of Classification Search
None
See application file for complete search history.

(56) References Cited

U.S. PATENT DOCUMENTS 11,470,488 B1 * 10/2022 Babaei ................. H04W 76/27
12,191,962 B2    1/2025 Yang et al.
(Continued)

FOREIGN PATENT DOCUMENTS

CN    109803275 A    5/2019
CN    110896546 A    3/2020
(Continued)

OTHER PUBLICATIONS

ISR received in application No. PCT/CN2022/113217 dated Oct. 24, 2022.
(Continued)

*Primary Examiner* — Anh Vu H Ly
(74) *Attorney, Agent, or Firm* — VOLPE KOENIG

(57) ABSTRACT

Method and device for wireless communications, comprising evaluating first-type radio link quality according to a first reference signal set, whenever the evaluated first-type radio link quality is worse than a first threshold, a first counter being increased by 1, the first counter being greater than or equal to a first value being used to trigger a first beam failure recovery; evaluating second-type radio link quality according to a second reference signal set, whenever the evaluated second-type radio link quality is worse than a second threshold, a second counter being increased by 1, the second counter being greater than or equal to a second value being used to trigger a second beam failure recovery; the first reference signal set and the second reference signal set at least comprising one reference signal resource respectively; the method proposed in the present application can realize beam failure recovery in the case of multi-transmission point.

20 Claims, 6 Drawing Sheets

(56) References Cited

U.S. PATENT DOCUMENTS

| | | | |
|---|---|---|---|
| 2020/0052769 A1 | 2/2020 | Cirik et al. | |
| 2020/0267797 A1* | 8/2020 | Wei | H04B 7/06964 |
| 2020/0383167 A1 | 12/2020 | Sengupta | |
| 2021/0100031 A1 | 4/2021 | Cirik | |
| 2022/0046441 A1* | 2/2022 | Agiwal | H04B 7/088 |
| 2022/0360314 A1* | 11/2022 | Zhu | H04B 7/0695 |
| 2023/0276278 A1* | 8/2023 | Loehr | H04B 7/06964 |
| | | | 370/329 |
| 2023/0284197 A1* | 9/2023 | Zhang | H04B 7/0695 |
| | | | 370/225 |

FOREIGN PATENT DOCUMENTS

| | | |
|---|---|---|
| CN | 111093219 A | 5/2020 |
| CN | 111836293 A | 10/2020 |
| WO | 2021034672 A1 | 2/2021 |

OTHER PUBLICATIONS

Supplementary European Search Report received in application EP22860359.3 dated Aug. 29, 2024.

Huawei et al., "Enhancements on beam management for multi-TRP in Rel-17," 3GPP TSG RAN WG1 Meeting #106-e, R1-2106466, e-Meeting (Aug. 16-27, 2021).

Third Generation Partnership Project, "Technical Specification Group Radio Access Network; NR; Physical channels and modulation (Release 16)," 3GPP TS 38.211 V16.6.0 (Jun. 2021).

Third Generation Partnership Project, "Technical Specification Group Radio Access Network; NR; Physical layer procedures for control (Release 16)," 3GPP TS 38.213 V16.6.0 (Jun. 2021).

Third Generation Partnership Project, "Technical Specification Group Radio Access Network; NR; Physical layer procedures for data (Release 17)," 3GPP TS 38.214 V16.6.0 (Jun. 2021).

Third Generation Partnership Project, "Technical Specification Group Radio Access Network; NR; Medium Access Control (MAC) protocol specification (Release 16)," 3GPP TS 38.321 V16.5.0 (Jun. 2021).

Third Generation Partnership Project, "Technical Specification Group Radio Access Network; NR; Radio Resource Control (RRC) protocol specification (Release 16)," 3GPP TS 38.331 V16.5.0 (Jun. 2021).

ZTE, "Enhancements on beam management for multi-TRP," 3GPP TSG RAN WG1 Meeting #106-e, R1-2106544 , e-Meeting (Aug. 16-27, 2021).

Third Generation Partnership Project, "Technical Specification Group Radio Access Network; NR; NR and NG-RAN Overall Description; Stage 2 (Release 16)," 3GPP TS 38.300 V16.6.0 (Jun. 2021).

Third Generation Partnership Project, "Technical Specification Group Radio Access Network; NR; Radio Link Control (RLC) protocol specification (Release 16)," 3GPP TS 38.322 V16.2.0 (Dec. 2020).

* cited by examiner

//  METHOD AND DEVICE FOR REPORTING BEAM FAILURE RECOVERY INFORMATION

CROSS REFERENCE TO RELATED APPLICATIONS

This application is the continuation of the international patent application No. PCT/CN2022/113217, filed on Aug. 18, 2022, which claims the priority benefit of Chinese Patent Application No. 202110973336.6, filed on Aug. 24, 2021, the full disclosure of which is incorporated herein by reference.

BACKGROUND

Technical Field

The present application relates to transmission methods and devices in wireless communication systems, and in particular to a method and device for network optimization, multiple TRP communications, as well as mobility of layer 1 and layer 2 and associated signalings of wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In communications, both Long Term Evolution (LTE) and 5G NR involves features of correct reception of reliable information, optimized energy efficiency ratio (EER), determination of information efficiency, flexible resource allocation, elastic system structure, efficient information processing on non-access layer, lower traffic interruption and call drop rate and support for low power consumption, which are of great significance to the maintenance of normal communications between a base station and a UE, rational scheduling of resources, and also in the balance of system payload, thus laying a solid foundation for increasing throughout, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X) and Device to Device (D2D), Unlicensed Spectrum communications, and monitoring on UE communication quality, network plan optimization, Non Terrestrial Network (NTN) and Terrestrial Network (TN), or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE can be connected to the network directly or through a relay.

With the increase of scenarios and complexity of systems, higher requirements are put forward for interruption rate and latency decrease, reliability and system stability enhancement, traffic flexibility and power saving. At the same time, compatibility between different versions of different systems should be considered when designing the systems.

SUMMARY

In a variety of communication scenarios, the use of multi-antenna is involved, e.g., MIMO techniques, specifically for example transmitting information to a user through multiple transmission points or multiple transmission and reception points (multi-TRP). Using multi-TRP may be helpful in different situations to increase throughput and expand coverage. To further improve performance, multiple TRPs comprised in multi-TRP can come from a same cell identified by a physical cell identity, or from different cells identified by different physical cells. In earlier versions of 5G NR, a serving cell and a physical cell identity usually have a definite relationship, and it is generally considered that one serving cell only comprises one physical cell identity, and one physical cell identity only belongs to one serving cell. Therefore, problems arise when configuring TRPs from cells identified by different physical cell identities to users through one cell, which is a feature that many aspects of the current 5G system cannot support. On the other hand, when the user detects a beam failure and triggers a beam failure recovery, it is necessary to indicate relevant information to the network, such as indicating beam failure recovery information. This is going to encounter some difficulties, including how to report beam failure recovery information with fewer bits, how to report beam failure recovery information of multiple cells at the same time, how to use Medium Access Control Control Element (MAC CE), a relatively fixed format signaling method, for reporting, how to report as much beam failure recovery information as possible for different uplink resources, and how to maintain certain compatibility with existing protocol architectures, all of which are issues that need to be addressed in the procedure of supporting beam failure recovery of multiple TRPs.

To address the above problem, the present application provides a solution.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict.

The present application provides a method in a first node for wireless communications, comprising:

evaluating first-type radio link quality according to a first reference signal set, whenever the evaluated first-type radio link quality is worse than a first threshold, a first counter being increased by 1, the first counter being greater than or equal to a first value being used to trigger a first beam failure recovery; evaluating second-type radio link quality according to a second reference signal set, whenever the evaluated second-type radio link quality is worse than a second threshold, a second counter being increased by 1, the second counter being greater than or equal to a second value being used to trigger a second beam failure recovery; the first reference signal set and the second reference signal set at least comprising one reference signal resource respectively; any reference signal resource in the first reference signal set and any reference signal resource in the second reference signal set being non-Quasi-Co-Located (non-QCL); and as a response to at least one of the first beam failure recovery or the second beam failure recovery being triggered, transmitting a second message; the second message comprising a first bitmap, first beam failure recovery information and second beam failure recovery information; any bit in the first bitmap being used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery;

herein, the second message is a control signaling of a MAC layer; the first candidate reference signal resource and the second candidate reference signal resource are different.

In one embodiment, a problem to be solved in the present application comprises: in a cell supporting multiple TRPs, how to report beam failure recovery information.

In one embodiment, advantages of the above method include: the method proposed in this application can support reporting of beam failure recovery information in case of multi-TRP, including beam failure information reporting of multi-TRP of a special cell, a secondary cell or a mixture of the above two, which has advantages of good flexibility and efficiency as well as compatibility.

Specifically, according to one aspect of the present application, the first bitmap comprises a first bit, the first bit corresponds to a first cell, the first bit is set to 1, and the first bit indicates the first beam failure recovery information; the first beam failure recovery information comprises a first octet; the first octet comprises a AC field set to 1 and a reserved field set to 0, and the AC field set to 1 indicates that the first octet also comprises a first candidate reference signal index; the reserved field set to 0 occupies a second most significant bit of the first octet; the second beam failure recovery information comprises a second octet; a second most significant bit of the second octet being set to 1 is used to indicate that the second beam failure recovery information is not indicated by any bit in the first bitmap; the first bitmap, the first octet and the second octet belong to a same MAC CE.

Specifically, according to one aspect of the present application, third-type radio link quality is evaluated according to reference signal resources in the second reference signal set; whenever the evaluated third-type radio link quality is worse than a third threshold, a third counter is increased by 1; as a response to the third counter being greater than or equal to a third value, a third beam failure recovery is triggered;

the second beam failure recovery and the third beam failure recovery are respectively for a second cell and a third cell; the first bitmap comprises a bit respectively corresponding to an index of the second cell and an index of the third cell; whether the second message comprises third beam failure recovery information is used to determine whether a bit in the first bitmap corresponding to an index of the second cell is set to 1; the third beam failure recovery information is beam failure recovery information for the third beam failure recovery;

the meaning of the phrase of whether the second message comprises third beam failure recovery information being used to determine whether a bit in the first bitmap corresponding to an index of the second cell is set to 1 comprises: when the second message comprises the third beam failure recovery information, whether a bit in the first bitmap corresponding to an index of the second cell is set to 1 is unrelated to both the second beam failure recovery information and the third beam failure recovery information; when the second message does not comprise the third beam failure recovery information, a bit in the first bitmap corresponding to an index of the second cell is set to 1;

a bit in the first bitmap corresponding to an index of the second cell being set to 1 is used to indicate beam failure recovery information of the second cell.

Specifically, according to one aspect of the present application, the second message comprises a first MAC CE and a second MAC CE, the first MAC CE comprises the first beam failure recovery information, and the second MAC CE comprises the second beam failure recovery information;

the first MAC CE only comprises beam failure recovery information of a beam failure recovery determined according to radio link quality evaluated by reference signal resources in the first reference signal set;

the second MAC CE only comprises beam failure recovery information of a beam failure recovery determined according to radio link quality evaluated by reference signal resources in the second reference signal set.

Specifically, according to one aspect of the present application, a first signaling is received, the first signaling is used to configure a first cell group, a physCellId in ServingCellConfigCommon comprised in the first signaling is only used to indicate a former of the first Physical Cell Identifier (PCI) and the second PCI; a cell corresponding to any bit in the first bitmap belongs to the first cell group;

the first reference signal set is associated with the first PCI; the second reference signal set is associated with the second PCI;

when uplink resources cannot carry all beam failure recovery information, the first MAC CE is transmitted preferentially.

Specifically, according to one aspect of the present application, a first signaling is received, the first signaling is used to configure the first cell group, a physCellId in ServingCellConfigCommon comprised in the first signaling is only used to indicate a former of the first PCI and the second PCI; a cell corresponding to any bit in the first bitmap belongs to the first cell group;

the first reference signal set is associated with the first PCI; the second reference signal set is associated with the second PCI;

when uplink resources cannot carry all beam failure recovery information, beam failure recovery information of an SpCell is transmitted preferentially.

Specifically, according to one aspect of the present application, the second beam failure recovery information comprises a second octet; the second beam failure recovery information comprises a AC field set to 0; the second beam failure recovery information comprises a second candidate reference signal index, the second candidate reference signal index is used to identify the second candidate reference signal resource for the second beam failure recovery; the second candidate reference signal index at least comprises a non-zero bit, the second candidate reference signal index occupies 6 least significant bits in the second octet, and 6 least significant bits in the second octet at least comprise a non-zero bit used to indicate the second candidate reference signal index; the AC field comprised in the second beam failure recovery information is not used to indicate the second candidate reference signal index;

the first beam failure recovery information comprises a AC field set to 1 and the AC field comprised in the first beam failure recovery information is used to indicate a first candidate reference signal index; the first candidate reference signal index is used to identify the first candidate reference signal resource for the first beam failure recovery.

Specifically, according to one aspect of the present application, the first bitmap comprises a first sub-bitmap and a second sub-bitmap, and the first sub-bitmap is used to indicate beam failure recovery information of a beam failure recovery determined according to radio link quality evaluated by reference signal resources in the first reference signal set;

the second sub-bitmap is used to determine beam failure recovery information of a beam failure recovery determined according to radio link quality evaluated by reference signal resources in the second reference signal set.

herein, the first bitmap comprises K bit(s), the first sub-bitmap comprises K1 bit(s), the second sub-bitmap comprises K2 bit(s), and the first sub-bitmap and the second sub-bitmap are orthogonal; K, K1 and K2 are respectively positive integers.

Specifically, according to one aspect of the present application, the second message comprises a first field, and the first field is used to indicate a beam failure detection result of an SpCell; whether the second message belongs to a random access procedure is used to determine whether the first field indicates whether a beam failure is detected according to the first reference signal set or the second reference signal set of an SpCell;

when the second message is transmitted in a random access procedure, the first field indicates that a beam failure is detected according to reference signal resources associated with an SpCell in the first reference signal set, and a beam failure is also detected according to reference signal resources associated with an SpCell in the second reference signal set;

when the second message is transmitted outside a random access procedure, the first field indicates that a beam failure is detected according to one of reference signal resources associated with an SpCell in the first reference signal set and reference signal resources associated with an SpCell in the second reference signal set.

Specifically, according to one aspect of the present application, the first node is a UE.

Specifically, according to one aspect of the present application, the first node is an IoT terminal.

Specifically, according to one aspect of the present application, the first node is a relay.

Specifically, according to one aspect of the present application, the first node is a vehicle terminal.

Specifically, according to one aspect of the present application, the first node is an aircraft.

A method in a second node for wireless communications, comprising:

transmitting a first message, the first message being used to indicate a first reference signal set and a second reference signal set;

a receiver of the first message, evaluating first-type radio link quality according to the first reference signal set, whenever the evaluated first-type radio link quality is worse than a first threshold, a first counter being increased by 1, the first counter being greater than or equal to a first value being used to trigger a first beam failure recovery; evaluating second-type radio link quality according to the second reference signal set, whenever the evaluated second-type radio link quality is worse than a second threshold, a second counter being increased by 1, the second counter being greater than or equal to a second value being used to trigger a second beam failure recovery; the first reference signal set and the second reference signal set at least comprising one reference signal resource respectively; any reference signal resource in the first reference signal set and any reference signal resource in the second reference signal set being non-QCL; and receiving a second message; and the second message comprising a first bitmap, first beam failure recovery information and second beam failure recovery information; any bit in the first bitmap being used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery;

herein, the second message is a control signaling of a MAC layer; the first candidate reference signal resource and the second candidate reference signal resource are different.

Specifically, according to one aspect of the present application, the first bitmap comprises a first bit, the first bit corresponds to a first cell, the first bit is set to 1, and the first bit indicates the first beam failure recovery information; the first beam failure recovery information comprises a first octet; the first octet comprises a AC field set to 1 and a reserved field set to 0, and the AC field set to 1 indicates that the first octet also comprises a first candidate reference signal index; the reserved field set to 0 occupies a second most significant bit of the first octet; the second beam failure recovery information comprises a second octet; a second most significant bit of the second octet being set to 1 is used to indicate that the second beam failure recovery information is not indicated by any bit in the first bitmap; the first bitmap, the first octet and the second octet belong to a same MAC CE.

Specifically, according to one aspect of the present application, the second message comprises a first MAC CE and a second MAC CE, the first MAC CE comprises the first beam failure recovery information, and the second MAC CE comprises the second beam failure recovery information;

the first MAC CE only comprises beam failure recovery information of a beam failure recovery determined according to radio link quality evaluated by reference signal resources in the first reference signal set;

the second MAC CE only comprises beam failure recovery information of a beam failure recovery determined according to radio link quality evaluated by reference signal resources in the second reference signal set.

Specifically, according to one aspect of the present application, a first signaling is transmitted, the first signaling is used to configure a first cell group, a physCellId in ServingCellConfigCommon comprised in the first signaling is only used to indicate a former of the first PCI and the second PCI; a cell corresponding to any bit in the first bitmap belongs to the first cell group;

the first reference signal set is associated with the first PCI; the second reference signal set is associated with the second PCI;

when uplink resources cannot carry all beam failure recovery information, the first MAC CE is transmitted preferentially.

Specifically, according to one aspect of the present application, a first signaling is transmitted, the first signaling is used to configure the first cell group, a physCellId in ServingCellConfigCommon comprised in the first signaling is only used to indicate a former of the first PCI and the second PCI; a cell corresponding to any bit in the first bitmap belongs to the first cell group;

the first reference signal set is associated with the first PCI; the second reference signal set is associated with the second PCI;

when uplink resources cannot carry all beam failure recovery information, beam failure recovery information of an SpCell is transmitted preferentially.

Specifically, according to one aspect of the present application, the second beam failure recovery information comprises a second octet; the second beam failure recovery information comprises a AC field set to 0; the second beam failure recovery information comprises a second candidate reference signal index, the second candidate reference signal index is used to identify the second candidate reference signal resource for the second beam failure recovery; the second candidate reference signal index at least comprises a non-zero bit, the second candidate reference signal index occupies 6 least significant bits in the second octet, and 6 least significant bits in the second octet at least comprise a non-zero bit used to indicate the second candidate reference signal index; the AC field comprised in the second beam failure recovery information is not used to indicate the second candidate reference signal index;

the first beam failure recovery information comprises a AC field set to 1 and the AC field comprised in the first beam failure recovery information is used to indicate a first candidate reference signal index; the first candidate reference signal index is used to identify the first candidate reference signal resource for the first beam failure recovery.

Specifically, according to one aspect of the present application, the first bitmap comprises a first sub-bitmap and a second sub-bitmap, and the first sub-bitmap is used to indicate beam failure recovery information of a beam failure recovery determined according to radio link quality evaluated by reference signal resources in the first reference signal set;

the second sub-bitmap is used to determine beam failure recovery information of a beam failure recovery determined according to radio link quality evaluated by reference signal resources in the second reference signal set;

herein, the first bitmap comprises K bit(s), the first sub-bitmap comprises K1 bit(s), the second sub-bitmap comprises K2 bit(s), and the first sub-bitmap and the second sub-bitmap are orthogonal; K, K1 and K2 are respectively positive integers.

Specifically, according to one aspect of the present application, the second message comprises a first field, and the first field is used to indicate a beam failure detection result of an SpCell; whether the second message belongs to a random access procedure is used to determine whether the first field indicates whether a beam failure is detected according to the first reference signal set or the second reference signal set of an SpCell;

when the second message is transmitted in a random access procedure, the first field indicates that a beam failure is detected according to reference signal resources associated with an SpCell in the first reference signal set, and a beam failure is also detected according to reference signal resources associated with an SpCell in the second reference signal set;

when the second message is transmitted outside a random access procedure, the first field indicates that a beam failure is detected according to one of reference signal resources associated with an SpCell in the first reference signal set and reference signal resources associated with an SpCell in the second reference signal set.

Specifically, according to one aspect of the present application, the second node is a UE.

Specifically, according to one aspect of the present application, the second node is an IoT terminal.

Specifically, according to one aspect of the present application, the second node is a relay.

Specifically, according to one aspect of the present application, the second node is a vehicle terminal.

Specifically, according to one aspect of the present application, the second node is an aircraft.

The present application provides a first node for wireless communications, comprising:

a first receiver, evaluating first-type radio link quality according to a first reference signal set, whenever the evaluated first-type radio link quality is worse than a first threshold, a first counter being increased by 1, the first counter being greater than or equal to a first value being used to trigger a first beam failure recovery; evaluating second-type radio link quality according to a second reference signal set, whenever the evaluated second-type radio link quality is worse than a second threshold, a second counter being increased by 1, the second counter being greater than or equal to a second value being used to trigger a second beam failure recovery; the first reference signal set and the second reference signal set at least comprising one reference signal resource respectively; any reference signal resource in the first reference signal set and any reference signal resource in the second reference signal set being non-QCL;

a first transmitter, as a response to at least one of the first beam failure recovery or the second beam failure recovery being triggered, transmitting a second message; the second message comprising a first bitmap, first beam failure recovery information and second beam failure recovery information; any bit in the first bitmap being used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery; herein, the second message is a control signaling of a MAC layer; the first candidate reference signal resource and the second candidate reference signal resource are different.

The present application provides a second node for wireless communications, comprising:

a second transmitter, transmitting a first message, the first message being used to indicate a first reference signal set and a second reference signal set;

a receiver of the first message, evaluating first-type radio link quality according to the first reference signal set, whenever the evaluated first-type radio link quality is worse than a first threshold, a first counter being increased by 1, the first counter being greater than or equal to a first value being used to trigger a first beam failure recovery; evaluating second-type radio link quality according to the second reference signal set, whenever the evaluated second-type radio link quality is worse than a second threshold, a second counter being increased by 1, the second counter being greater than or equal to a second value being used to trigger a second beam failure recovery; the first reference signal set and the second reference signal set at least comprising one reference signal resource respectively; any reference signal resource in the first reference signal set and any reference signal resource in the second reference signal set being non-QCL; and a second receiver, receiving a second message; the second message comprising a first bitmap, first beam failure recovery information and second beam failure recovery information; any bit in the first bitmap being used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery;

herein, the second message is a control signaling of a MAC layer; the first candidate reference signal resource and the second candidate reference signal resource are different.

In one embodiment, the present application has the following advantages over conventional schemes:

the present application has good compatibility, which can be achieved by extending a BFR MAC CE without affecting the UE of the previous version.

a minimum MAC CE size can be maintained, and the reporting can still be completed in case of limited uplink resources with small effect on the algorithm implementation for resource allocation at the base station side.

beam failure recovery information for both SpCell and SCell can be reported at the same time.

the good fairness of reported beam failure recovery information can be guaranteed when resources are limited and only beam failure recovery information of partial cells can be reported.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
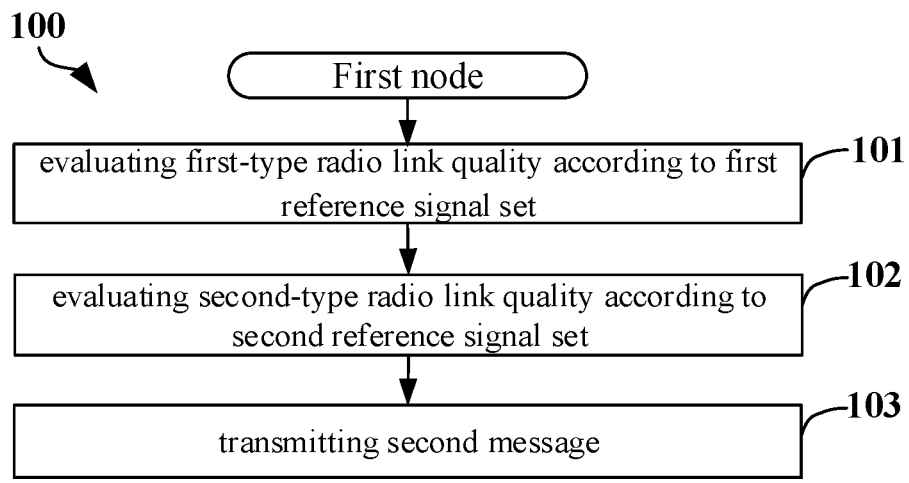
FIG. 1 illustrates a flowchart of evaluating first-type radio link quality according to a first reference signal set, evaluating second-type radio link quality according to a second reference signal set, and transmitting a second message according to one embodiment of the present application.

Embodiment 1 illustrates a flowchart of evaluating first-type radio link quality according to a first reference signal set, evaluating second-type radio link quality according to a second reference signal set, and transmitting a second message according to one embodiment of the present application, as shown in FIG. 1. In FIG. 1, each box represents a step. Particularly, the sequential order of steps in these boxes does not necessarily mean that the steps are chronologically arranged.

In embodiment 1, the first node in the present application evaluates first-type radio link quality according to a first reference signal set in step 101; evaluates second-type radio link quality according to a second reference signal set in step 102; and transmits a second message in step 103;

herein, whenever the evaluated first-type radio link quality is worse than a first threshold, a first counter is increased by 1, the first counter is greater than or equal to a first value is used to trigger a first beam failure recovery; whenever the evaluated second-type radio link quality is worse than a second threshold, a second counter is increased by 1, the second counter is greater than or equal to a second value is used to trigger a second beam failure recovery; the first reference signal set and the second reference signal set respectively comprise at least one reference signal resource; any reference signal resource in the first reference signal set and any reference signal resource in the second reference signal set are non-QCL;

as a response to at least one of the first beam failure recovery or the second beam failure recovery being triggered, transmitting a second message; the second message comprising a first bitmap, first beam failure recovery information and second beam failure recovery information; any bit in the first bitmap being used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery;

the second message is a control signaling of a MAC layer; the first candidate reference signal resource and the second candidate reference signal resource are different.

In one embodiment, the first node is a User Equipment (UE).

In one embodiment, the first node is a Mobile Station (MS).

In one embodiment, bandwidth self-adaptation is supported in 5G NR; a subset of a total cell bandwidths of a cell is called a BWP; the base station realizes bandwidth self-adaptation by configuring BWPs to the UE and telling the UE which of the configured BWPs is a currently active BWP.

In one embodiment, embodiments and/or characteristics of multi-TRP comprise that the UE has multiple activated TCIs of the same BWP.

In one embodiment, embodiments and/or characteristics of multi-TRP comprise that a same serving cell is associated with or has two different PCIs.

In one embodiment, the embodiments and/or characteristics of multi-TRP comprise that a UE is configured with multiple Component Carriers (CCs) belonging to a same serving cell, and reference signals of the multiple CCs of the same serving cell are non-QCL.

In one embodiment, the embodiments and/or characteristics of multi-TRP comprise that a UE is configured with multiple CCs belonging to a same serving cell, and reference signals respectively associated with the multiple CCs of the same serving cell are non-QCL.

In one embodiment, the embodiments and/or characteristics of multi-TRP comprise that a UE is configured that at least two reference signal resources used for a radio link monitoring for a same BWP and a same serving cell are non-QCL.

In one embodiment, the embodiments and/or characteristics of multi-TRP comprise that a UE is configured that at least two reference signal indexes used for a radio link monitoring for a same BWP and a same serving cell are non-QCL.

In one embodiment, the embodiments and/or characteristics of multi-TRP comprise that a UE is configured that reference signal resources identified by at least two reference signal indexes used for a radio link monitoring for a same BWP and a same serving cell are non-QCL.

In one embodiment, the embodiments and/or characteristics of multi-TRP comprise that a UE is configured that at least two reference signal resources used for a beam failure detection for a same BWP and a same serving cell are non-QCL.

In one embodiment, the embodiments and/or characteristics of multi-TRP comprise that a UE is configured that at least two reference signal indexes used for a beam failure detection for a same BWP and a same serving cell are non-QCL.

In one embodiment, the embodiments and/or characteristics of multi-TRP comprise that a UE is configured that reference signal resources identified by at least two reference signal indexes used for a beam failure detection for a same BWP and a same serving cell are non-QCL.

In one embodiment, the embodiments and/or characteristics of multi-TRP comprise that a UE is configured that at least two among reference signal resources used for a beam failure detection for a same BWP and a same serving cell are non-QCL.

In one embodiment, the embodiments and/or characteristics of multi-TRP comprise that a UE is configured that at least two among reference signal indexes used for a beam failure detection for a same BWP and a same serving cell are non-QCL.

In one embodiment, the embodiments and/or characteristics of multi-TRP comprise that a UE is configured that at least two among reference signal resources identified by a reference signal index used for a beam failure detection for a same BWP and a same serving cell are non-QCL.

In one embodiment, the embodiments and/or characteristics of multi-TRP comprise that a UE is configured with at least two $\bar{q}_0$ for a same BWP and a same serving cell.

In one subembodiment of the embodiment, the at least two $\bar{q}_0$ for a same BWP and a same serving cell are non-QCL.

In one subembodiment of the embodiment, the at least two $\bar{q}_0$ for a same BWP and a same serving cell are configured with indexes by periodic CSI-RS resources with a value same as a reference signal index in a reference signal set indicated by a TCI-State for a CORESET used for monitoring PDCCH, and the TCI-State comprises at least two reference signal indexes with qcl-Type of 'type D'.

In one subembodiment of the embodiment, the at least two $\bar{q}_0$ for a same BWP and a same serving cell are configured with indexes by periodic CSI-RS resources with a value same as a reference signal index in a reference signal set indicated by two TCI-States of a CORESET used to monitor at least two PDCCHs, and the two TCI-State respectively comprise at least one reference signal index with a qcl-Type of 'TypeD'.

In one subembodiment of the embodiment, at least two $\bar{q}_0$ for a same BWP and a same serving cell are configured with indexes by periodic CSI-RS resources with a value same as a reference signal index in a reference signal set indicated by TCI-State for at least two CORESETs used for monitoring PDCCH, and reference signal indexes indicated by the TCI-State at least have two reference signal indexes with qcl-Type of 'type D'.

In one subembodiment of the embodiment, the at least two $\bar{q}_0$ for a same BWP and a same serving cell are configured through failureDetectionResourcesToAddModList.

In one embodiment, the embodiments and/or characteristics of multi-TRP comprise that a UE is configured with at least two $\bar{q}_1$ for a same BWP and a same serving cell.

In one subembodiment of the embodiment, the at least two $\bar{q}_1$ for a same BWP and the same serving cell are non-QCL.

In one subembodiment of the embodiment, the at least two $\bar{q}_1$ for a same BWP and a same serving cell are configured through a candidateBeamRSList or a candidateBeamRSListExt or a candidateBeamRSSCellList.

In one embodiment, the first node receives a first message, and the first message is used to indicate the first reference signal set.

In one subembodiment of the above embodiment, the first message comprises a first reference signal index set, and reference signal indexes comprised in the first reference signal index set respectively correspond to reference signal resources in the first reference signal set.

In one subembodiment of the above embodiment, the first message comprises a first reference signal index set, and any reference signal index comprised in the first reference signal index set identifies a reference signal resource in the first reference signal set; any reference signal resource in the first reference signal set can be identified by a reference signal index in the first reference signal index set.

In one subembodiment of the above embodiment, the first message comprises a first reference signal index set, and a set consists of reference signal resources identified by reference signal indexes comprised in the first reference signal index set is the first reference signal set.

In one subembodiment of the above embodiment, the first message comprises a first reference signal index set, and the first reference signal set is configured by a RadioLinkMonitoringRS.

In one subembodiment of the above embodiment, the first message comprises a first reference signal index set, and the first reference signal index set is configured by a failureDetectionResourcesToAddModList.

In one embodiment, the first node receives a first message, and the first message is used to indicate the second reference signal set.

In one subembodiment of the above embodiment, the first message comprises a second reference signal index set, and reference signal indexes comprised in the second reference signal index set respectively correspond to reference signal resources in the second reference signal set.

In one subembodiment of the above embodiment, the first message comprises a second reference signal index set, and any reference signal index comprised in the second reference signal index set identifies a reference signal resource in the second reference signal set; any reference signal resource in the second reference signal set can be identified by a reference signal index in the second reference signal index set.

In one subembodiment of the above embodiment, the first message comprises a second reference signal index set, and a set consists of reference signal resources identified by reference signal indexes comprised in the second reference signal index set is the second reference signal set.

In one subembodiment of the above embodiment, the first message comprises a second reference signal index set, and the second reference signal set is configured by a RadioLinkMonitoringRS.

In one subembodiment of the above embodiment, the first message comprises a second reference signal index set, and the second reference signal index set is configured by a failureDetectionResourcesToAddModList.

In one embodiment, the first node receives a first message, the first message indicates the first reference signal index set, and the first reference signal index set is used to indicate the first reference signal set.

In one embodiment, the first node receives a first message, the first message indicates the second reference signal index set, and the second reference signal index set is used to indicate the second reference signal set.

In one embodiment, the first reference signal set and the second reference signal set are respectively used for a beam failure detection.

In one embodiment, the first reference signal set is orthogonal to the second reference signal set.

In one embodiment, a transmitter of the first message is a serving cell of the first node.

In one embodiment, a transmitter of the first message is a PCell of the first node.

In one embodiment, a transmitter of the first message is an SpCell of the first node.

In one embodiment, the first message is an RRC message.

In one embodiment, the first message comprises or only comprises an RRCReconfiguration.

In one subembodiment of the above embodiment, the first message comprises a first radio link monitoring configuration.

In one subembodiment of the above embodiment, the first message comprises an RRCReconfiguration message.

In one subembodiment of the above embodiment, the first message comprises a RadioLinkMonitoringConfig.

In one subembodiment of the above embodiment, the first message comprises a RadioLinkMonitoringConfig of each BWP.

In one subembodiment of the above embodiment, the first message comprises a RadioLinkMonitoringConfig of an active BWP.

In one subembodiment of the above embodiment, the first message comprises a RadioLinkMonitoringConfig of a BWP.

In one embodiment, the first message comprises a first radio link monitoring configuration.

In one subembodiment of the above embodiment, the second sub-message comprises a RadioLinkMonitoringConfig.

In one subembodiment of the above embodiment, a first radio link monitoring configuration comprises a RadioLinkMonitoringConfig.

In one subembodiment of the above embodiment, a first radio link monitoring configuration is a RadioLinkMonitoringConfig.

In one subembodiment of the above embodiment, a first radio link monitoring configuration is a BeamFailureRecoveryConfig.

In one subembodiment of the above embodiment, a first radio link monitoring configuration comprises a RadioLinkMonitoringRS.

In one subembodiment of the above embodiment, a first radio link monitoring configuration is a RadioLinkMonitoringRS.

In one subembodiment of the above embodiment, a first radio link monitoring configuration indicates reference signal resources provided by or associated with an activated TCI state in CORESETs used to receive a PDCCH on an activated BWP of the first node.

In one subembodiment of the above embodiment, the first radio link monitoring configuration comprises the first reference signal index set.

In one embodiment, the first message indicates an identity of the first radio link monitoring configuration.

In one embodiment, the first reference signal set is configured by unicast; and the second reference signal set is configured by non-unicast.

In one embodiment, the first reference signal set is configured by unicast; and the second reference signal set is configured by unicast.

In one embodiment, any reference signal resource in the first reference signal set is synchronization signal block or synchronization signal/PBCH block (SSB) or Channel State Information-Reference Signal (CSI-RS) resources.

In one embodiment, an index of each reference signal in the first reference signal set is an ssb-index or a csi-rs-index.

In one embodiment, each reference signal index in the first reference signal index set indicates a reference signal resource, and the reference signal resource is an SSB or a CSI-RS resource.

In one embodiment, each reference signal index in the first reference signal index set indicates a reference signal resource, and the reference signal resource is an SSB resource or a CSI-RS resource.

In one embodiment, each reference signal index in the first reference signal index set indicates a reference signal resource, and the reference signal resource is a resource occupied by an SSB resource or a resource occupied by a CSI-RS resource.

In one embodiment, each reference signal index in the second reference signal index set indicates a reference signal resource, and the reference signal resource is an SSB or a CSI-RS resource.

In one embodiment, each reference signal index in the second reference signal index set indicates a reference signal resource, and the reference signal resource is an SSB resource or a CSI-RS resource.

In one embodiment, each reference signal index in the second reference signal index set indicates a reference signal resource, and the reference signal resource is a resource occupied by an SSB resource or a resource occupied by a CSI-RS resource.

In one embodiment, the csi-rs-index indicates an NZP-CSI-RS-ResourceId.

In one embodiment, the SSB is a synchronization signal block.

In one embodiment, the SSB is a synchronization signal/PBCH block (SS/PBCH block).

In one embodiment, any reference signal index in the first reference signal index set is a non-negative integer.

In one embodiment, any reference signal index in the first reference signal index set is a structure.

In one embodiment, any reference signal index in the first reference signal index set is a structure comprising a non-negative integer.

In one embodiment, any reference signal index in the first reference signal index set comprises a physical cell ID and a structure of an SSB-index.

In one embodiment, any reference signal index in the first reference signal index set comprises a physical cell ID and a structure of a csi-rs-index.

In one embodiment, any reference signal index in the first reference signal index set comprises an SSB-index.

In one embodiment, any reference signal index in the first reference signal index set comprises a csi-rs-index.

In one embodiment, any reference signal index in the first reference signal index set comprises a NZP-CSI-RS-ResourceId.

In one embodiment, any reference signal index in the first reference signal index set comprises a CSI-RS Resource Indicator (CRI).

In one embodiment, reference signal resources indicated by each reference signal index in the first reference signal index set are a detectionResource.

In one embodiment, reference signal resources indicated by each reference signal index in the first reference signal index set are an SSB-index.

In one embodiment, reference signal resources indicated by each reference signal index in the first reference signal index set are resources corresponding to or identified by or determined by an SSB-index.

In one embodiment, reference signal resources indicated by each reference signal index in the first reference signal index set are a csi-rs-index.

In one embodiment, reference signal resources indicated by each reference signal index in the first reference signal index set are resources corresponding to or identified by or determined by a csi-rs-index.

In one embodiment, the resources comprise at least one of time-domain, frequency-domain or spatial-domain resources.

In one embodiment, a reference signal index corresponding to at least partial reference signal resources of a BWP used for multicast belongs to the first reference signal index set.

In one embodiment, the being used for multicast comprises Multicast Broadcast Service (MBS).

In one embodiment, the multicast service comprises MBS.

In one embodiment, the being used for multicast comprises Point to Multipoint (PTM).

In one embodiment, reference signal resources comprised in the first reference signal set belong to a same BWP.

In one embodiment, reference signal resources comprised in the first reference signal set belong to an active BWP.

In one embodiment, reference signal resources comprised in the second reference signal set belong to a same BWP.

In one embodiment, reference signal resources comprised in the second reference signal set belong to an active BWP.

In one embodiment, for the specific meaning of the $\bar{q}_0$ refer to section 6 in 3GPP TS38. 213.

In one embodiment, for the specific meaning of the $\bar{q}_1$ refer to section 6 in 3GPP TS38. 213.

In one embodiment, for the specific meaning of the QCL-TypeD, refer to section 5.1.5 in 3GPP TS38.214.

In one embodiment, the first message indicates a TCI state corresponding to CORESETs used when a PDCCH is monitored, and the first reference signal set comprises reference signal resources indicated by a TCI state corresponding to CORESETs used when a PDCCH is monitored.

In one embodiment, a TCI state is used to indicate a positive integer number of reference signal resource(s) and/or reference signal(s).

In one embodiment, a reference signal indicated by a TCI state comprises at least one of a CSI-RS, an SRS, or an SS/PBCH block.

In one embodiment, reference signal resource(s) indicated by a TCI state comprises at least one of an index of a CSI-RS, an index of an SRS or an index of an SS/PBCH block.

In one embodiment, a TCI state is used to indicate a reference signal and/or a reference signal resource with a type of QCL-TypeD.

In one embodiment, for the specific meaning of the QCL-TypeD, refer to section 5.1.5 in 3GPP TS38.214.

In one embodiment, a reference signal and/or reference signal resource indicated by a TCI state is used to determine a Quasi-Co-Located (QCL) parameter.

In one embodiment, a reference signal/reference signal resource indicated by a TCI state is used to determine spatial filtering.

In one embodiment, a reference signal/reference signal resource indicated by a TCI state is used to determine spatial Rx parameters.

In one embodiment, a reference signal/reference signal resource indicated by a TCI state is used to determine spatial Tx parameters.

In one embodiment, the QCL correspond to QCL-Type D.

In one embodiment, the first message explicitly indicates a QCL relationship of reference signal resources in the first reference signal set and the second reference signal set.

In one embodiment, the first message explicitly indicates a QCL relationship of reference signal resources in the first reference signal set.

In one embodiment, the meaning of the phrase of any reference signal resource in the first reference signal set and any reference signal resource in the second reference signal set being non-QCL comprises that a serving cell of the first node is not configured that the first reference signal set and the second reference signal set are QCL.

In one embodiment, the meaning of the phrase of any reference signal resource in the first reference signal set and any reference signal resource in the second reference signal set being non-QCL comprises that a serving cell of the first node is not configured that any reference signal resource in the first reference signal set and any reference signal resource in the second reference signal set are QCL.

In one embodiment, the meaning of the phrase of any reference signal resource in the first reference signal set and any reference signal resource in the second reference signal set being non-QCL comprises that a serving cell of the first node is not configured that any reference signal resource in the first reference signal set and any reference signal resource in the second reference signal set are QCL with same reference signal resources.

In one embodiment, the meaning of the phrase of any reference signal resource in the first reference signal set and any reference signal resource in the second reference signal set being non-QCL comprises that any reference signal resource in the first reference signal set and any reference signal resource in the second reference signal set are QCL with different reference signal resources.

In one embodiment, the meaning of the phrase of any reference signal resource in the first reference signal set and any reference signal resource in the second reference signal set being non-QCL comprises that an ssb-index having a QCL relation with any reference signal resource in the first reference signal index is different from an ssb-index having a QCL relation with any reference signal resource in the second reference signal set.

In one embodiment, the meaning of the phrase of any reference signal resource in the first reference signal set and any reference signal resource in the second reference signal set being non-QCL comprises that the first reference signal set and the second reference signal set are respectively associated with different TRPs.

In one embodiment, the meaning of the phrase of any reference signal resource in the first reference signal set and any reference signal resource in the second reference signal set being non-QCL comprises that the first reference signal set and the second reference signal set are respectively associated with different PCIs.

In one embodiment, the first reference signal index set comprises a reference signal index associated with the first PCI, and also comprises a reference signal index associated with the second PCI.

In one embodiment, any reference signal index comprised in the first reference signal index set is associated with the first PCI.

In one embodiment, any reference signal index comprised in the first reference signal index set is associated with a PCI.

In one embodiment, the first threshold is Qout_LR.

In one embodiment, the first threshold is determined by a receiving quality of a PDCCH.

In one embodiment, the first threshold corresponds to RSRP of a radio link when a BLER of an assumed PDCCH is 10%.

In one embodiment, the first threshold corresponds to a radio link observation quality or the first-type radio link quality when a BLER of a PDCCH is 10%.

In one embodiment, the first threshold corresponds to radio link quality or the first-type radio link quality when a BLER of an assumed PDCCH is 10%.

In one subembodiment of the above embodiment, assuming that a PDCCH channel is transmitted on reference signal resources of the first reference signal set, a measured or theoretical result of reference signal resources of the first reference signal set when reception quality of the PDCCH is when BLER equal to 10% is the first threshold value.

In one subembodiment of the above embodiment, when a measured result of reference signal resources in the first reference signal set is the first threshold, a PDCCH is transmitted on reference signal resources of the first reference signal set, then a BLER of the transmitted PDCCH is equal to 10%.

In one subembodiment of the above embodiment, assuming that a PDCCH is transmitted on a resource block to which reference signal resources of the first reference signal set belong, a measured or theoretical result of reference signal resources when reception quality of the PDCCH is when BLER equal to 10% is the first threshold value.

In one subembodiment of the above embodiment, when a measured result of reference signal resources in the first reference signal set is the first threshold, a PDCCH is transmitted on a resource block to which reference signal resources of the first reference signal set belong, then a BLER of the transmitted PDCCH is equal to 10%.

In one subembodiment of the above embodiment, the first threshold is an observed or theoretical result of reference signal resources in the first reference signal set as determined by a hypothetical experiment for reception quality of a PDCCH channel, where the reception quality of the PDCCH channel is BLER equal to 10%.

In one embodiment, the first threshold is RSRP, and the first-type radio link quality is a RSRP of reference signal resources of the first reference signal set.

In one subembodiment of the embodiment, RSRP of reference signal resources of the first reference signal set is a measurement result on reference signal resources of the first reference signal set.

In one subembodiment of the embodiment, RSRP of one or all reference signal resources of the first reference signal set is an evaluation result on reference signal resources of the first reference signal set.

In one embodiment, the definition of the first threshold is a level at which a downlink at which a downlink radio link under a given resource configuration in the first reference signal set cannot be reliably received, and the reliable reception refers to transmission quality corresponding to the assumed PDCCH transmission experiment when BLER is equal to 10%.

In one embodiment, the first-type radio link quality is a best one of measurement results on all reference signal resources comprised in the first reference signal set.

In one embodiment, the first-type radio link quality is a best one of L1-RSRP measurement results on all reference signal resources comprised in the first reference signal set.

In one embodiment, the first-type radio link quality is a worst one of measurement results on all reference signal resources comprised in the first reference signal set.

In one embodiment, the first-type radio link quality is an average value of measurement results on all reference signal resources comprised in the first reference signal set.

In one embodiment, the first-type radio link quality is a measurement result on a reference signal resource comprised in the first reference signal set.

In one embodiment, the behavior of evaluating first-type radio link quality according to a first reference signal set comprises measuring channel quality of reference signal resources of the first reference signal set to obtain the first-type radio link quality.

In one embodiment, the behavior of evaluating first-type radio link quality according to a first reference signal set comprises determining PDCCH channel reception quality in the PDCCH transmission hypothesis test according to a resource configuration of the first reference signal set.

In one embodiment, the behavior of evaluating first-type radio link quality according to a first reference signal set comprises determining whether a downlink radio signal can be reliably received according to reference signal resources in the first reference signal set.

In one embodiment, the behavior of evaluating first-type radio link quality according to a first reference signal set comprises determining whether a downlink radio signal can be reliably received according to a configuration of reference signal resources in the first reference signal set.

In one embodiment, the behavior of evaluating first-type radio link quality according to a first reference signal set comprises performing a radio channel measurement according to a configuration of reference signal resources in the first reference signal set to determine whether a downlink radio signal can be reliably received.

In one embodiment, the first counter is BFI_COUNTER.

In one embodiment, a name of the first counter comprises a BFI.

In one embodiment, the first value is configurable.

In one embodiment, the first value is configured by a serving cell of the first node.

In one embodiment, the first message indicates the first value.

In one embodiment, the first value is a positive integer.

In one embodiment, the first value is a beamFailureInstanceMaxCount.

In one embodiment, the first beam failure recovery is a Beam Failure Recovery (BFR).

In one embodiment, the first beam failure recovery belongs to or comprises a BFR.

In one embodiment, the first beam failure recovery is a procedure for beam failure recovery.

In one embodiment, the first beam failure recovery is a procedure for determining a new available beam.

In one embodiment, the first message indicates a first candidate reference signal set.

In one embodiment, the first message comprises a first candidate reference signal index set, any reference signal index in the first candidate reference signal index set is used to identify a reference signal resource, and all reference signal resources identified by reference signal indexes comprised in the first candidate reference signal index set consist of the first candidate reference signal set.

In one embodiment, the first message comprises a first candidate reference signal index set, and the first reference signal index set is a set consists of indexes of reference signal resources in the first reference signal set.

In one embodiment, the first candidate reference signal resource belongs to the first candidate reference signal set.

In one embodiment, the first message comprises a first candidate threshold, and the first candidate threshold is an rsrp-ThresholdSSB or an rsrp-ThresholdCSI-RS.

In one embodiment, reference signal resources in the first candidate reference signal set whose L1-RSRP measurement result is equal to or better than reference signal resources of the first candidate threshold are determined as the first candidate reference signal resource.

In one embodiment, the first candidate reference signal set comprises a first candidate reference signal subset, indexes of all reference signal resources comprised the first candidate reference signal subset is a first candidate reference signal index subset, and the first candidate reference signal index subset is a subset of the first candidate reference signal index set.

In one embodiment, the first candidate reference signal resource belongs to the first candidate reference signal subset.

In one embodiment, the first candidate reference signal set comprises at least one reference signal resource.

In one embodiment, the first candidate reference signal set comprises a second candidate reference signal subset, indexes of all reference signal resources comprised in the second candidate reference signal subset is a second candidate reference signal index subset, and the second candidate reference signal index subset is a subset of the first candidate reference signal index set.

In one embodiment, the second candidate reference signal resource belongs to the second candidate reference signal subset.

In one embodiment, the first candidate reference signal subset is orthogonal to the second candidate reference signal subset.

In one embodiment, the first candidate reference signal subset and the second candidate reference signal subset are respectively associated with a first PCI and a second PCI.

In one embodiment, the first candidate reference signal subset and the second reference signal subset respectively comprise at least one reference signal resource.

In one embodiment, a reference signal resource with a base channel quality in the first candidate reference signal subset is determined as the first candidate reference signal resource.

In one embodiment, any reference signal resource satisfying certain quality requirements in the first candidate reference signal subset is determined as the first candidate reference signal resource.

In one embodiment, a reference signal resource with a base channel quality in the second candidate reference signal subset is determined as the second candidate reference signal resource.

In one embodiment, any reference signal resource satisfying certain quality requirements in the second candidate reference signal subset is determined as the second candidate reference signal resource.

In one embodiment, any reference signal resource in the first candidate reference signal subset is associated with the first PCI.

In one embodiment, any reference signal resource in the second candidate reference signal subset is associated with the second PCI.

In one embodiment, the second threshold is Qout_LR.

In one embodiment, the second threshold is determined by a receiving quality of a PDCCH.

In one embodiment, the second threshold corresponds to RSRP of a radio link when a BLER of an assumed PDCCH is 10%.

In one embodiment, the second threshold corresponds to a radio link observation quality or the second-type radio link quality when a BLER of a PDCCH is 10%.

In one embodiment, the second threshold corresponds to radio link quality or the second-type radio link quality when a BLER of an assumed PDCCH is 10%.

In one subembodiment of the above embodiment, assuming that a PDCCH channel is transmitted on reference signal resources of the second reference signal set, a measured or theoretical result of reference signal resources of the second reference signal set when reception quality of the PDCCH is when BLER equal to 10% is the second threshold value.

In one subembodiment of the above embodiment, when a measured result of reference signal resources in the second reference signal set is the second threshold, a PDCCH is transmitted on reference signal resources of the second reference signal set, then a BLER of the transmitted PDCCH is equal to 10%.

In one subembodiment of the above embodiment, assuming that a PDCCH is transmitted on a resource block to which reference signal resources of the second reference signal set belong, a measured or theoretical result of reference signal resources when reception quality of the PDCCH is when BLER equal to 10% is the second threshold value.

In one subembodiment of the above embodiment, when a measured result of reference signal resources in the second reference signal set is the second threshold, a PDCCH is transmitted on a resource block to which reference signal resources of the second reference signal set belong, then a BLER of the transmitted PDCCH is equal to 10%.

In one subembodiment of the above embodiment, the second threshold is an observed or theoretical result of reference signal resources in the second reference signal set as determined by a hypothetical experiment for reception quality of a PDCCH channel, where the reception quality of the PDCCH channel is BLER equal to 10%.

In one embodiment, the second threshold is RSRP, and the second-type radio link quality is a RSRP of reference signal resources of the second reference signal set.

In one subembodiment of the embodiment, an RSRP of reference signal resources of the second reference signal set is a measurement result on reference signal resources of the second reference signal set.

In one subembodiment of the embodiment, RSRP of one or all reference signal resources of the second reference signal set is an evaluation result on reference signal resources of the second reference signal set.

In one embodiment, the definition of the second threshold is a level at which a downlink at which a downlink radio link under a given resource configuration in the second reference signal set cannot be reliably received, and the reliable reception refers to transmission quality corresponding to the assumed PDCCH transmission experiment when BLER is equal to 10%.

In one embodiment, the second-type radio link quality is a best one of measurement results on all reference signal resources comprised in the second reference signal set.

In one embodiment, the second-type radio link quality is a best one of L1-RSRP measurement results on all reference signal resources comprised in the first reference signal set.

In one embodiment, the second-type radio link quality is a worst one of measurement results on all reference signal resources comprised in the second reference signal set.

In one embodiment, the second-type radio link quality is an average value of measurement results on all reference signal resources comprised in the second reference signal set.

In one embodiment, the second-type radio link quality is a measurement result on a reference signal resource comprised in the second reference signal set.

In one embodiment, the behavior of evaluating second-type radio link quality according to a second reference signal set comprises measuring channel quality of reference signal resources of the second reference signal set to obtain the second-type radio link quality.

In one embodiment, the behavior of evaluating second-type radio link quality according to a second reference signal set comprises determining PDCCH channel reception quality in the PDCCH transmission hypothesis test according to a resource configuration of the second reference signal set.

In one embodiment, the behavior of evaluating second-type radio link quality according to a second reference signal set comprises determining whether a downlink radio signal can be reliably received according to reference signal resources in the second reference signal set.

In one embodiment, the behavior of evaluating second-type radio link quality according to a second reference signal set comprises determining whether a downlink radio signal can be reliably received according to a configuration of reference signal resources in the second reference signal set.

In one embodiment, the behavior of evaluating second-type radio link quality according to a second reference signal set comprises performing a radio channel measurement according to a configuration of reference signal resources in the second reference signal set to determine whether a downlink radio signal can be reliably received.

In one embodiment, the second counter is BFI_COUNTER.

In one embodiment, a name of the second counter comprises a BFI.

In one embodiment, the second value is configurable.

In one embodiment, the second value is configured by a serving cell of the first node.

In one embodiment, the first message indicates the second value.

In one embodiment, the first value is a positive integer.

In one embodiment, the second value is beamFailureInstanceMaxCount.

In one embodiment, the second beam failure recovery is a BFR.

In one embodiment, the second beam failure recovery belongs to or comprises BFR.

In one embodiment, the second beam failure recovery is a procedure for beam failure recovery.

In one embodiment, the second beam failure recovery is a procedure for determining a new available beam.

In one embodiment, the first message indicates a second candidate reference signal set.

In one embodiment, the first message comprises a second candidate reference signal index set, any reference signal index in the second candidate reference signal index set is used to identify a reference signal resource, and all reference signal resources identified by reference signal indexes comprised in the second candidate reference signal index set consist of the second candidate reference signal set.

In one embodiment, the first message comprises a second candidate reference signal index set, and the second reference signal index set is a set consists of indexes of reference signal resources in the second reference signal set.

In one embodiment, the second candidate reference signal resource belongs to the second candidate reference signal set.

In one embodiment, the second message comprises a first candidate threshold, and the second candidate threshold is an rsrp-ThresholdSSB or an rsrp-ThresholdCSI-RS.

In one embodiment, reference signal resources in the second candidate reference signal set whose L1-RSRP measurement result is equal to or better than reference signal resources of the second candidate threshold are determined as the second candidate reference signal resource.

In one embodiment, the second candidate reference signal set comprises a second candidate reference signal subset, indexes of all reference signal resources comprised in the second candidate reference signal subset is a second candidate reference signal index subset, and the second candidate reference signal index subset is a subset of the second candidate reference signal index set.

In one embodiment, the second candidate reference signal resource belongs to the second candidate reference signal subset.

In one embodiment, the first candidate reference signal subset is orthogonal to the second candidate reference signal subset.

In one embodiment, any reference signal resource in the first candidate reference signal subset and any reference signal resource in the second candidate reference signal subset are non-QCL.

In one embodiment, the first PCI is different from the second PCI.

In one embodiment, the first PCI is a Physical Cell Identifier.

In one embodiment, the first PCI is a PhysCellId.

In one embodiment, the first PCI is a Physical layer cell ID.

In one embodiment, the first PCI identifies a cell.

In one embodiment, the first PCI is used to generate an SSB identifying a cell.

In one embodiment, the first PCI and an SSB of its identified cell are QCL.

In one embodiment, the first PCI is a physCellId comprised in a received ServingCellConfigCommon.

In one embodiment, the first PCI is a physCellId comprised in a received spCellConfigCommon.

In one embodiment, the second PCI is a PCI.

In one embodiment, the second PCI is a PhysCellId.

In one embodiment, the second PCI is a Physical layer cell ID.

In one embodiment, the second PCI identifies a cell.

In one embodiment, the second PCI is used to generate an SSB identifying a cell.

In one embodiment, the second PCI and an SSB of its identified cell are QCL.

In one embodiment, the second PCI is not indicated by a physCellId comprised in a received ServingCellConfigCommon.

In one embodiment, the second PCI is not a physCellId comprised in a received spCellConfigCommon.

In one embodiment, the second PCI is not indicated by a received ServingCellConfigCommon.

In one embodiment, the first PCI identifies a first cell; the second PCI identifies a second cell.

In one embodiment, the first cell is a cell identified by a physCellId comprised in a ServingCellConfigCommon indicated by a serving cell of the first node.

In one embodiment, the first cell is a cell identified by a physCellId comprised in an SpCellConfigCommon indicated by a serving cell of the first node.

In one embodiment, either of the first beam failure recovery and the second beam failure recovery can trigger a transmission of the second message.

In one embodiment, after any of the first beam failure recovery and the second beam failure recovery is triggered, a MAC entity of the first node shall transmit the first beam failure recovery information for the first beam failure recovery and the second beam failure recovery information for the second beam failure recovery.

In one embodiment, after the first candidate reference signal resource is confirmed by a serving cell of the first node, the first node starts to use the first candidate reference signal resource.

In one embodiment, after the second candidate reference signal resource is confirmed by a serving cell of the first node, the first node starts to use the second candidate reference signal resource.

In one embodiment, the meaning of the first candidate reference signal resource being different from the second candidate reference signal resource include the following meaning: time-domain resources occupied by the first candidate reference signal resource and time-domain resources occupied by the second candidate reference signal resource are different.

In one embodiment, the meaning of the first candidate reference signal resource being different from the second candidate reference signal resource include the following meaning: frequency-domain resources occupied by the first candidate reference signal resource and frequency-domain resources occupied by the second candidate reference signal resource are different.

In one embodiment, the meaning of the first candidate reference signal resource being different from the second candidate reference signal resource include the following meaning: spatial-domain resources occupied by the first candidate reference signal resource and spatial-domain resources occupied by the second candidate reference signal resource are different.

In one embodiment, the meaning of the first candidate reference signal resource being different from the second candidate reference signal resource include the following meaning: the first candidate reference signal resource and the second candidate reference signal resource use different spatial parameters.

In one embodiment, the meaning of the first candidate reference signal resource being different from the second candidate reference signal resource include the following meaning: the first candidate reference signal resource and the second candidate reference signal resource belong to different TCI-States.

In one embodiment, the meaning of the first candidate reference signal resource being different from the second candidate reference signal resource include the following meaning: the first candidate reference signal resource and the second candidate reference signal resource are associated with different PCIs.

In one embodiment, the first beam failure comprises a TRP-level beam failure and/or cell-level beam failure.

In one embodiment, the second beam failure comprises a TRP-level beam failure and/or cell-level beam failure.

In one embodiment, the meaning of the phrase of "whenever the evaluated first-type radio link quality is worse than a first threshold" comprises: the first node evaluates the first radio link quality according to L1 reference signal resources in reference signal resources indicated by the first reference signal set in an evaluation period, when the first radio link quality is worse than the first threshold, a physical layer of the first node reports a first-type indication to a higher layer of the first node.

In one subembodiment of the embodiment, the evaluation period is frame.

In one subembodiment of the embodiment, the evaluation period of the first-type radio link quality is 10 milliseconds.

In one subembodiment of the embodiment, the evaluation period of the first-type radio link quality is n milliseconds, where n is a positive integer.

In one subembodiment of the embodiment, the evaluation period is determined according to a DRX period and a measurement interval (gap).

In one subembodiment of the above embodiment, the evaluation period of the first-type radio link quality is a maximum value between a shortest radio link monitoring period and a Discontinuous Reception (DRX) period.

In one subembodiment of the above embodiment, L1 is equal to 1.

In one subembodiment of the above embodiment, L2 is equal to 2.

In one subembodiment of the embodiment, L1 is equal to a number of elements in the first reference signal set.

In one subembodiment of the embodiment, the first-type indication is a beam failure instance indication.

In one subembodiment of the embodiment, the first-type indication comprises a beam failure related indication.

In one subembodiment of the embodiment, the first-type indication comprises a detection of a beam failure.

In one embodiment, the meaning of the phrase of "whenever the evaluated second-type radio link quality is worse than a second threshold" comprises: the first node evaluates the second radio link quality according to L2 reference signal resources in reference signal resources indicated by the second reference signal set in an evaluation period, when the second radio link quality is worse than the second threshold value, a physical layer of the first node reports a second-type indication to a higher layer of the first node.

In one subembodiment of the embodiment, the evaluation period is frame.

In one subembodiment of the embodiment, the evaluation period of the second-type radio link quality is 10 milliseconds.

In one subembodiment of the embodiment, the evaluation period of the second-type radio link quality is n milliseconds, where n is a positive integer.

In one subembodiment of the embodiment, the evaluation period is determined according to a DRX period and a measurement interval (gap).

In one subembodiment of the above embodiment, the evaluation period of the second-type radio link quality is a maximum value between a shortest radio link monitoring period and a Discontinuous Reception (DRX) period.

In one subembodiment of the above embodiment, L2 is equal to 1.

In one subembodiment of the above embodiment, L2 is equal to 2.

In one subembodiment of the embodiment, L2 is equal to a number of elements in the first reference signal set.

In one subembodiment of the embodiment, the second-type indication is a beam failure instance indication.

In one subembodiment of the embodiment, the second-type indication comprises a beam failure related indication.

In one subembodiment of the embodiment, the second-type indication comprises a detection of a beam failure.

In one embodiment, the meaning of a reference signal being associated with a PCI comprises: the PCI is used to generate the reference signal.

In one embodiment, the meaning of a reference signal being associated with a PCI comprises: the reference signal and an SSB of a cell identified by a PCI are QCL.

In one embodiment, the meaning of a reference signal being associated with a PCI comprises: the reference signal is transmitted by a cell identified by a PCI.

In one embodiment, the meaning of a reference signal being associated with a PCI comprises: the reference signal is indicated by a configuration signaling, an RLC bearer that the configuration signaling goes through is configured by a CellGroupConfig IE, and a Special Cell (SpCell) configured by the CellGroupConfig IE comprises the cell;

In one embodiment, the meaning of a reference signal resource being associated with a PCI comprises: the PCI is used to generate the reference signal resource.

In one embodiment, the meaning of a reference signal resource being associated with a PCI comprises: the PCI is used to generate a reference signal transmitted on the reference signal resource.

In one embodiment, the meaning of a reference signal resource being associated with a PCI comprises: the reference signal resource and an SSB of a cell identified by a PCI are QCL.

In one embodiment, the meaning of a reference signal resource being associated with a PCI comprises: a cell identified by the PCI transmits a reference signal on the reference signal resource.

In one embodiment, the meaning of a reference signal resource being associated with a PCI comprises: the reference signal resource is indicated by a configuration signaling, an RLC bearer that the configuration signaling goes through is configured by a CellGroupConfig IE, and a Special Cell (SpCell) configured by the CellGroupConfig IE comprises the cell;

In one embodiment, the meaning of a reference signal index is associated with a PCI comprises: the PCI is used to generate a reference signal identified by the reference signal index.

In one embodiment, the meaning of a reference signal index is associated with a PCI comprises: the PCI is used to generate the reference signal index.

In one embodiment, the meaning of a reference signal index is associated with a PCI comprises: the identified reference signal resources of the reference signal resource and an SSB of an identified cell of the PCI are QCL.

In one embodiment, the meaning of a reference signal index is associated with a PCI comprises: a cell identified by the PCI transmits a reference signal on reference signal resources identified by the reference signal index.

In one embodiment, the meaning of a reference signal index is associated with a PCI comprises: the reference signal index is indicated by a configuration signaling, an RLC bearer that the configuration signaling goes through is configured by a CellGroupConfig IE, and a Special Cell (SpCell) configured by the CellGroupConfig IE comprises the cell;

In one embodiment, the second message is MAC CE(s).

In one embodiment, the second message is a MAC CE.

In one embodiment, the second message is a MAC CE group.

In one embodiment, the second message comprises two MAC CEs.

In one embodiment, a name of the second message comprises BFR.

In one embodiment, a name of the second message comprises TRP.

In one embodiment, a name of the second message comprises mBFR.

In one embodiment, a name of the second message comprises eBFR.

In one embodiment, a name of the second message comprises ext.

In one embodiment, a name of the second message comprises type.

In one embodiment, the second message comprises a complete MAC CE, the complete MAC CE refers to if any bit in the first bitmap in the complete MAC CE is 1, the second message must comprise an octet comprising a AC field corresponding to bits that are 1 in the first bitmap.

In one embodiment, the second message comprises a truncated MAC CE, the truncated MAC CE refers to if any bit in the first bitmap in the truncated MAC CE is 1, the second message may comprise an octet comprising a AC field corresponding to bits that are 1 in the first bitmap.

In one embodiment, the second message comprises a truncated MAC CE, the truncated MAC CE refers to that the truncated MAC CE carries as many octets comprising a AC field as possible according to uplink allocated resources.

In one embodiment, an index of a logical channel ID corresponding to the complete MAC CE comprised in the second message is 50 or 314.

In one embodiment, an index of a logical channel ID corresponding to the truncated MAC CE comprised in the second message is 51 or 315.

In one embodiment, an index of a logical channel ID corresponding to the complete MAC CE comprised in the second message is a value other than 50 or 314.

In one embodiment, an index of a logical channel ID corresponding to the truncated MAC CE comprised in the second message is a value other than 51 or 315.

In one embodiment, the second message either comprises the complete MAC CE or the truncated MAC CE.

In one embodiment, a logical channel ID of the complete MAC CE is different from a logical channel ID of the truncated MAC CE.

In one embodiment, a logical channel identity (LCID) uniquely identifies a MAC CE or a type of the MAC CE.

In one embodiment, the first bitmap at least comprises one bit.

In one embodiment, any bit in the first bitmap is set to 1 to indicate that a beam failure is detected.

In one embodiment, any bit in the first bitmap is set to 0 to indicate that a beam failure is not detected or a beam failure is detected but a candidate beam evaluation is not completed.

In one embodiment, any bit in the first bitmap is used to indicate whether an octet comprising an AC field occurs.

In one embodiment, any bit in the first bitmap is used to indicate whether an octet comprising an AC field occurs in the second message.

In one embodiment, any bit in the first bitmap corresponds to a cell.

In one embodiment, any bit in the first bitmap corresponds to a cell index.

In one embodiment, any bit in the first bitmap corresponds to a CC.

In one embodiment, any bit in the first bitmap corresponds to a TRP.

In one embodiment, any bit in the first bitmap corresponds to $\bar{q}_0$.

In one embodiment, any bit in the first bitmap corresponds to a beam.

In one embodiment, any bit in the first bitmap corresponds to an antenna port.

In one embodiment, any bit in the first bitmap corresponds to an activated TCI or an activated TCI-State.

In one embodiment, any bit in the first bitmap corresponds to a group of reference signal resources with QCL relationship with each other.

In one embodiment, the meaning of the phrase of at least a former of the first beam failure recovery information and the second beam failure recovery information being associated with the first bitmap comprises: the first bitmap indicates the first beam failure recovery information.

In one embodiment, the meaning of the phrase of at least a former of the first beam failure recovery information and the second beam failure recovery information being associated with the first bitmap comprises: the first bitmap indicates the second beam failure recovery information.

In one embodiment, the meaning of the phrase of at least a former of the first beam failure recovery information and the second beam failure recovery information being associated with the first bitmap comprises: the first bitmap indicates that the first beam failure recovery information occurs.

In one embodiment, the meaning of the phrase of at least a former of the first beam failure recovery information and the second beam failure recovery information being associated with the first bitmap comprises: the first bitmap indicates that the second beam failure recovery information occurs.

In one embodiment, the meaning of the phrase of at least a former of the first beam failure recovery information and the second beam failure recovery information being associated with the first bitmap comprises: the first bitmap does not indicate the second beam failure recovery information.

In one embodiment, the meaning of the phrase of at least a former of the first beam failure recovery information and the second beam failure recovery information being associated with the first bitmap comprises: the first bitmap does not indicate that the second beam failure recovery information occurs.

In one embodiment, the meaning of the phrase of at least a former of the first beam failure recovery information and the second beam failure recovery information being associated with the first bitmap comprises: the first bitmap indicates that the first beam failure recovery is triggered.

In one embodiment, the meaning of the phrase of at least a former of the first beam failure recovery information and the second beam failure recovery information being associated with the first bitmap comprises: the first bitmap indicates that the second beam failure recovery is triggered.

In one embodiment, the meaning of the phrase of at least a former of the first beam failure recovery information and the second beam failure recovery information being associated with the first bitmap comprises: the first bitmap does not indicate that the second beam failure recovery is triggered.

In one embodiment, the meaning of the phrase of at least a former of the first beam failure recovery information and the second beam failure recovery information being associated with the first bitmap comprises: the first bitmap comprises a bit corresponding to the first beam failure recovery information.

In one embodiment, the meaning of the phrase of at least a former of the first beam failure recovery information and the second beam failure recovery information being associated with the first bitmap comprises: the first beam failure recovery information is used to determine a value of at least one bit in the first bitmap.

In one embodiment, the meaning of the phrase of at least a former of the first beam failure recovery information and the second beam failure recovery information being associated with the first bitmap comprises: the first beam failure recovery information is used to determine that at least one bit in the first bitmap is set to 1.

In one embodiment, the meaning of the phrase of at least a former of the first beam failure recovery information and the second beam failure recovery information being associated with the first bitmap comprises: the first bitmap comprises a bit corresponding to the second beam failure recovery information.

In one embodiment, the meaning of the phrase of at least a former of the first beam failure recovery information and the second beam failure recovery information being associated with the first bitmap comprises: the second beam failure recovery information is used to determine a value of at least one bit in the first bitmap.

In one embodiment, the meaning of the phrase of at least a former of the first beam failure recovery information and the second beam failure recovery information being associated with the first bitmap comprises: the second beam failure recovery information is used to determine that at least one bit in the first bitmap is set to 1.

In one embodiment, the meaning of the phrase of at least a former of the first beam failure recovery information and the second beam failure recovery information being associated with the first bitmap comprises: the first bitmap does not comprise a bit corresponding to the second beam failure recovery information.

In one embodiment, the meaning of the phrase of at least a former of the first beam failure recovery information and the second beam failure recovery information being associated with the first bitmap comprises: the second beam failure recovery information is not used to determine a value of any bit in the first bitmap.

In one embodiment, the meaning of the phrase of at least a former of the first beam failure recovery information and the second beam failure recovery information being associated with the first bitmap comprises: the second beam failure recovery information is not used to determine that any bit in the first bitmap is set to 1.

In one embodiment, the meaning of the phrase of at least a former of the first beam failure recovery information and the second beam failure recovery information being associated with the first bitmap comprises: a value of a bit in the first bitmap is independent of the second beam failure recovery information.

In one embodiment, the first beam failure recovery information comprises a first candidate RS ID, and the first candidate RS ID is used to indicate the first candidate reference signal resource.

In one embodiment, the first beam failure recovery information comprises a first candidate RS ID, and the first candidate RS ID is used to identify the first candidate reference signal resource.

In one embodiment, the second beam failure recovery information comprises a second candidate RS ID, and the second candidate RS ID is used to indicate the second candidate reference signal resource.

In one embodiment, the second beam failure recovery information comprises a second candidate RS ID, and the second candidate RS ID is used to identify the second candidate reference signal resource.

In one embodiment, the first beam failure recovery information explicitly indicates the first candidate reference signal resource.

In one embodiment, the second beam failure recovery information explicitly indicates the second candidate reference signal resource.

In one embodiment, the first candidate RS ID is an index of an SSB whose SS-RSRP measurement value in the first candidate reference signal subset exceeds a first candidate threshold value.

In one subembodiment of the embodiment, the first candidate threshold is rsrp-ThresholdBFR.

In one subembodiment of the embodiment, the first candidate RS ID is an index of an SSB whose SS-RSRP measurement value in the first candidate reference signal subset exceeds a first candidate threshold value.

In one subembodiment of the embodiment, the first candidate RS ID is an index of a maximum SSB whose SS-RSRP measurement value in the first candidate reference signal subset exceeds an SS-RSRP measurement value of a first candidate threshold value.

In one subembodiment of the embodiment, the first candidate RS ID is an index of any SSB whose SS-RSRP measurement value in the first candidate reference signal subset exceeds a first candidate threshold value.

In one subembodiment of the embodiment, the first candidate reference signal resource is an SSB whose SS-RSRP measurement value in the first candidate reference signal subset exceeds a first candidate threshold.

In one subembodiment of the embodiment, the first candidate reference signal resource is resources of an SSB whose SS-RSRP measurement value in the first candidate reference signal subset exceeds a first candidate threshold.

In one embodiment, the first candidate RS ID is an index of a CSI-RS whose CSI-RSRP measurement value in the first candidate reference signal subset exceeds a second candidate threshold.

In one subembodiment of the embodiment, the second candidate threshold is rsrp-ThresholdBFR.

In one subembodiment of the embodiment, the first candidate RS ID is an index of a CSI-RS whose CSI-RSRP measurement value in the first candidate reference signal subset exceeds a first candidate threshold value.

In one subembodiment of the embodiment, the first candidate RS ID is any index of a CSI-RS whose CSI-RSRP measurement value in the first candidate reference signal subset exceeds a first candidate threshold value.

In one subembodiment of the embodiment, the first candidate RS ID is an index of a maximum CSI-RS whose CSI-RSRP measurement value in the first candidate reference signal subset exceeds a CSI-RSRP measurement value of a first candidate threshold value.

In one subembodiment of the embodiment, the first candidate reference signal resource is a CSI-RS whose SS-RSRP measurement value in the first candidate reference signal subset exceeds a first candidate threshold.

In one subembodiment of the embodiment, the first candidate reference signal resource is resources of a CSI-RS whose SS-RSRP measurement value in the first candidate reference signal subset exceeds a first candidate threshold.

In one embodiment, the second candidate RS ID is an index of an SSB whose SS-RSRP measurement value in the second candidate reference signal subset exceeds a first candidate threshold value.

In one subembodiment of the embodiment, the first candidate threshold is rsrp-ThresholdBFR.

In one embodiment, the second candidate RS ID is an index of an SSB whose SS-RSRP measurement value in the second candidate reference signal subset exceeds a first candidate threshold value.

In one subembodiment of the embodiment, the first candidate threshold is rsrp-ThresholdBFR.

In one subembodiment of the embodiment, the second candidate RS ID is an index of an SSB whose SS-RSRP measurement value in the second candidate reference signal subset exceeds a second candidate threshold value.

In one subembodiment of the embodiment, the second candidate RS ID is an index of a maximum SSB whose SS-RSRP measurement value in the second candidate reference signal subset exceeds an SS-RSRP measurement value of a second candidate threshold value.

In one subembodiment of the embodiment, the second candidate RS ID is an index of any SSB whose SS-RSRP measurement value in the second candidate reference signal subset exceeds a first candidate threshold value.

In one subembodiment of the embodiment, the second candidate reference signal resource is an SSB whose SS-RSRP measurement value in the second candidate reference signal subset exceeds a first candidate threshold.

In one subembodiment of the embodiment, the second candidate reference signal resource is resources of an SSB whose SS-RSRP measurement value in the second candidate reference signal subset exceeds a first candidate threshold.

In one embodiment, the second candidate RS ID is an index of a CSI-RS whose CSI-RSRP measurement value in the second candidate reference signal subset exceeds a second candidate threshold.

In one subembodiment of the embodiment, the second candidate threshold is rsrp-ThresholdBFR.

In one subembodiment of the embodiment, the second candidate RS ID is an index of a CSI-RS whose CSI-RSRP measurement value in the second candidate reference signal subset exceeds a second candidate threshold value.

In one subembodiment of the embodiment, the second candidate RS ID is an index of any CSI-RS whose CSI-RSRP measurement value in the second candidate reference signal subset exceeds a second candidate threshold value.

In one subembodiment of the embodiment, the second candidate RS ID is an index of a maximum CSI-RS whose CSI-RSRP measurement value in the second candidate reference signal subset exceeds a CSI-RSRP measurement value of a second candidate threshold value.

In one subembodiment of the embodiment, the second candidate reference signal resource is a CSI-RS whose CSI-RSRP measurement value in the second candidate reference signal subset exceeds a first candidate threshold.

In one subembodiment of the embodiment, the second candidate reference signal resource is resources of a CSI-RS whose CSI-RSRP measurement value in the second candidate reference signal subset exceeds a first candidate threshold.

In one embodiment, a value of a logical channel ID corresponding to a first-type MAC CE is a BFR (one octet Ci); a value of a logical channel ID corresponding to a second-type MAC CE is Truncated BFR (one octet Ci).

In one embodiment, a value of a logical channel ID corresponding to a third-type MAC CE is BFR (four octets Ci); a value of a logical channel ID corresponding to a fourth-type MAC CE is Truncated BFR (four octets Ci).

In one embodiment, the first MAC CE can be multiplexed in a same MAC PDU with the second message.

In one embodiment, the second MAC CE can be multiplexed in a same MAC PDU with the second message.

In one embodiment, the third MAC CE can be multiplexed in a same MAC PDU with the second message.

In one embodiment, the fourth MAC CE can be multiplexed in a same MAC PDU with the second message.

In one embodiment, the first MAC CE cannot be multiplexed in a same MAC PDU with the second message.

In one embodiment, the second MAC CE cannot be multiplexed into a same MAC PDU with the second message.

In one embodiment, the third MAC CE cannot be multiplexed into a same MAC PDU with the second message.

In one embodiment, the fourth MAC CE cannot be multiplexed into a same MAC PDU with the second message.

In one embodiment, the first MAC CE has a higher transmission priority than the second message.

In one embodiment, the second MAC CE has a higher transmission priority than the second message.

In one embodiment, the third MAC CE has a higher transmission priority than the second message.

In one embodiment, the fourth MAC CE has a higher transmission priority than the second message.

In one embodiment, the first MAC CE does not have a higher transmission priority than the second message.

In one embodiment, the second MAC CE does not have a higher transmission priority than the second message.

In one embodiment, the third MAC CE does not have a higher transmission priority than the second message.

In one embodiment, the fourth MAC CE does not have a higher transmission priority than the second message.

In one embodiment, the second message has a higher transmission priority than the first-type MAC CE.

In one embodiment, the second message has a higher transmission priority than the second-type MAC CE.

In one embodiment, the second message has a higher transmission priority than the third-type MAC CE.

In one embodiment, the second message has a higher transmission priority than the fourth-type MAC CE.

In one embodiment, transmission priorities of two types MAC CE in the first-type MAC CE, the second-type MAC CE, the third-type MAC CE and the fourth-type MAC CE are higher than the second message, and transmission priorities of the other two types MAC CE are not higher than the second message.

In one embodiment, a transmission priority of the second message is related to whether the second message comprises beam failure recovery information for SpCell.

In one subembodiment of the embodiment, when the second message comprises beam failure recovery information for SpCell, a transmission priority of the second message is higher than at least one of the first-type MAC CE, the second-type MAC CE, the third-type MAC CE or the fourth-type MAC CE.

In one subembodiment of the embodiment, a transmission of the second message does not belong to a random access procedure.

In one embodiment, the advantage of the above method is that beam failure recovery information of an SpCell can be reported in priority, so as to ensure the communication of SpCell as much as possible.

In one embodiment, the advantage of the above method is that transmission of a second message and the first-type MAC CE, the second-type MAC CE, the third-type MAC CE and the fourth-type MAC CE should be balanced as much as possible, especially when there are not sufficient uplink resources, it can ensure that as many or as comprehensive beam failure recovery information as possible is reported.

In one embodiment, the advantage of the above method is that transmission of a second message and the first-type MAC CE, the second-type MAC CE, the third-type MAC CE and the fourth-type MAC CE can maintain a better forward or backward compatibility.

In one embodiment, the second message is transmitted only when there is still a surplus after uplink resources are sufficient to transmit the first-type MAC CE or the third-type MAC CE.

In one embodiment, the second message or the fourth-type MAC CE are transmitted only when there is still a surplus after uplink resources are sufficient to transmit the second message.

In one embodiment, the second message or the fourth-type MAC CE are transmitted only when there is still a surplus after uplink resources are sufficient to transmit the complete MAC CE comprised in the second message.

In one embodiment, the truncated MAC CE and the second-type MAC CE comprised in the second message are not multiplexed in one MAC PDU at the same time.

In one embodiment, the truncated MAC CE and the second-type MAC CE comprised in the fourth message are not multiplexed in one MAC PDU at the same time.

In one embodiment, any bit in the first bitmap corresponds to a cell or a cell index.

In one embodiment, any bit in the first bitmap corresponds to a TRP or an index of a TRP.

In one embodiment, any bit in the first bitmap corresponds to a CC or an index of a CC.

In one embodiment, any bit in the first bitmap corresponds to an activated TCI state or an ID of an activated TCI state.

In one embodiment, any bit in the first bitmap corresponds to a PCI.

In one embodiment, any bit in the first bitmap corresponds to a group of reference signal resources or an index of reference signal resources.

In one embodiment, the link quality monitoring comprises radio link monitoring.

In one embodiment, the link quality monitoring comprises a Beam Failure Detection.

In one embodiment, the first cell group at least comprises a cell configured with two QCL reference signal indexes used for radio link monitoring.

In one embodiment, any bit in the first bitmap corresponds to a cell index comprising first beam failure recovery information, and any bit in the first bitmap is used to indicate whether an AC field comprising beam failure recovery information of a cell identified by a cell index corresponding to the any bit in the first bitmap is 1.

In one embodiment, only a former of the first beam failure recovery and the second beam failure recovery is used to determine a value of a bit of a cell index of a cell corresponding to the first beam failure recovery in the first bitmap.

In one embodiment, when the first beam failure recovery and the second beam failure recovery belong to a same cell, a bit in the first bitmap corresponding to a cell index of the same cell is set to 1; when the first beam failure recovery and the second beam failure recovery respectively belong to a first cell and a second cell, a bit in the first bitmap corresponding to a cell index of the first cell is set to 1; a bit in the first bitmap corresponding to a cell index of the second cell is set to 0.

In one embodiment, the first candidate reference signal index set comprises a first candidate reference signal index subset and a second candidate reference signal index subset.

In one subembodiment of the embodiment, any reference signal index in the first candidate reference signal index subset and any reference signal index in the second candidate reference signal index subset are non-QCL.

In one subembodiment of the embodiment, any reference signal index in the first candidate reference signal index subset and any reference signal index in the first reference signal index set are QCL.

In one subembodiment of the embodiment, any reference signal index in the second candidate reference signal index subset and any reference signal index in the second reference signal index set are QCL.

In one subembodiment of the embodiment, the first candidate reference signal index belongs to the first candidate reference signal index subset.

In one subembodiment of the embodiment, the second candidate reference signal index belongs to the second candidate reference signal index subset.

In one embodiment, the second message only comprises beam failure recovery information where a second most significant bit set to 1.

In one embodiment, the second beam failure recovery information precedes the first beam failure recovery information.

In one embodiment, the second beam failure recovery information precedes all beam failure recovery information indicated by the first bitmap.

In one embodiment, the second beam failure recovery information follows the first beam failure recovery information.

In one embodiment, a position of the second beam failure recovery information in the second message is related to whether a cell that the second beam failure recovery information is for belongs to an SpCell.

In one embodiment, when the second beam failure recovery information is beam failure recovery information of an SpCell, a priority of the second beam failure recovery information during transmission is greater than beam failure recovery information of an SCell.

Embodiment 2

Figure 2:
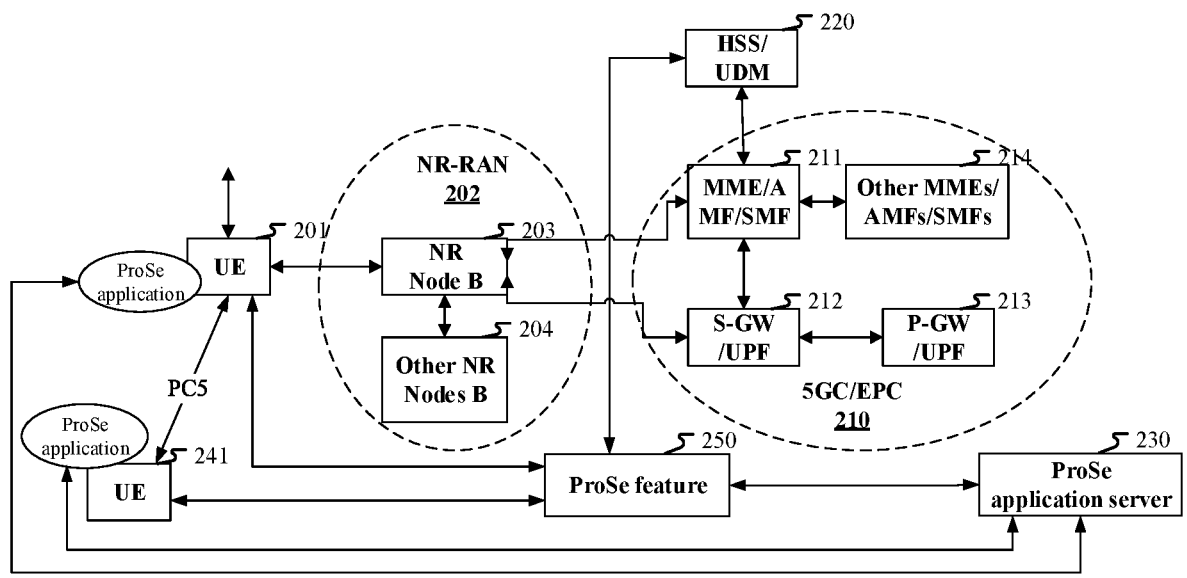
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present application can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS). If near-field communication (prose) is involved, the network architecture can also comprise network elements related to the near-field communications, such as ProSe function 250, ProSe application server 230, etc. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the first node in the present application is a UE 201.

In one embodiment, the second node in the present application is a gNB 203.

In one embodiment, a wireless link between the UE 201 and the NR node B is an uplink.

In one embodiment, a wireless link between the NR node B and the UE 201 is a downlink.

In one embodiment, the UE 201 supports relay transmission.

In one embodiment, the UE 201 supports multicast traffic.

In one embodiment, the UE 201 does not support relay transmission.

In one embodiment, the UE 201 supports multi-TRP transmission.

In one embodiment, the UE 201 is a vehicle comprising a car.

In one embodiment, the gNB 203 is a base station.

In one embodiment, the gNB 203 is a base station supporting multi-TRP.

In one embodiment, the gNB 203 is a base station supporting broadcast and multicast service.

In one embodiment, a DU of the gNB 203 manages a cell identified by the first PCI and a cell identified by the second PCI.

In one embodiment, the gNB 203 is a flight platform.

In one embodiment, the gNB 203 is satellite equipment.

Embodiment 3

Figure 3:
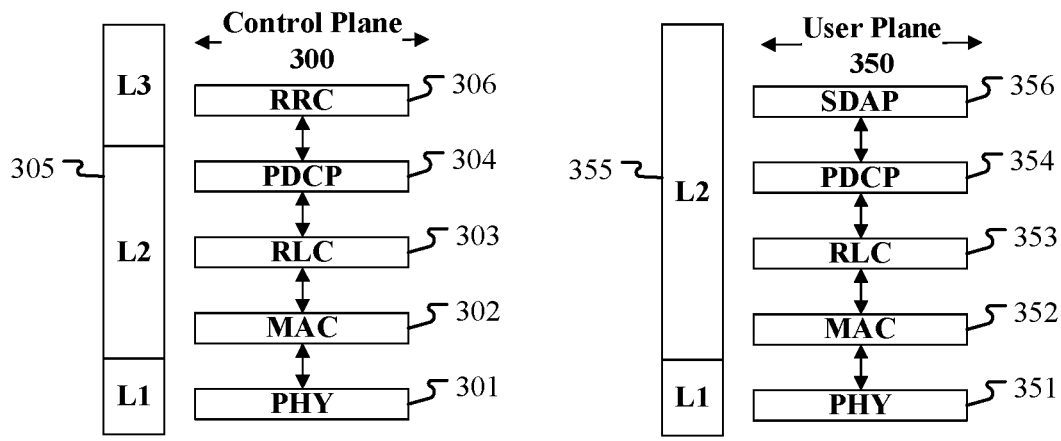
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in the figure, the first node may comprise several higher layers above the L2 305. also comprises a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first message in the present application is generated in the RRC 306 or the PHY 301.

In one embodiment, the second message in the present application is generated in the MAC 302.

In one embodiment, the first signaling in the present application is generated by the RRC 306.

Embodiment 4

Figure 4:
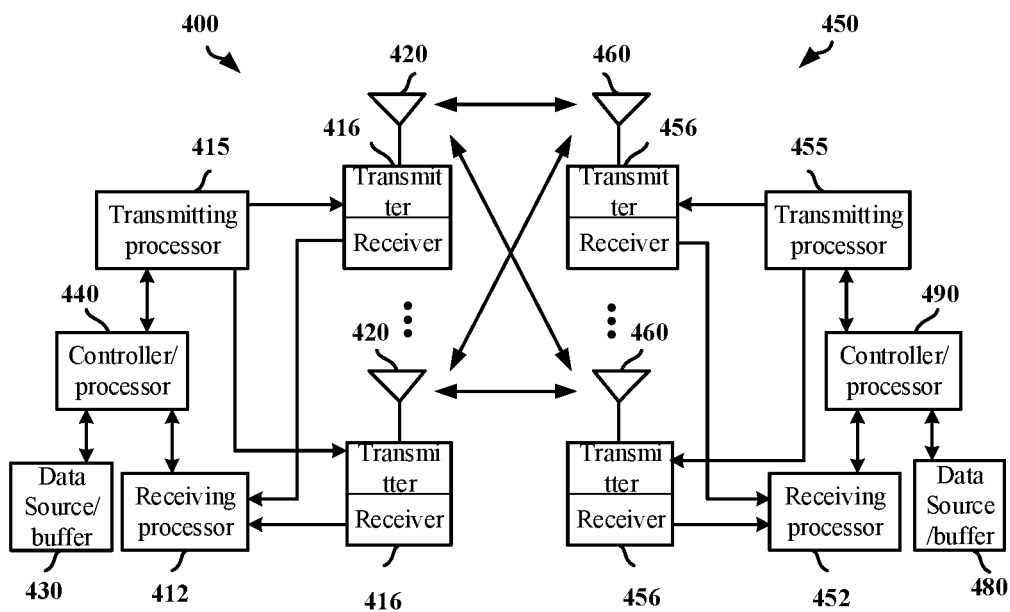
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/ processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: evaluates first-type radio link quality according to a first reference signal set, whenever the evaluated first-type radio link quality is worse than a first threshold, a first counter is increased by 1, the first counter being greater than or equal to a first value is used to trigger a first beam failure recovery; evaluates second-type radio link quality according to a second reference signal set, whenever the evaluated second-type radio link quality is worse than a second threshold, a second counter is increased by 1, the second counter being greater than or equal to a second value is used to trigger a second beam failure recovery; the first reference signal set and the second reference signal set respectively comprise at least one reference signal resource; any reference signal resource in the first reference signal set and any reference signal resource in the second reference signal set are non-QCL; as a response to at least one of the first beam failure recovery or the second beam failure recovery being triggered, transmits a second message; the second message comprises a first bitmap, first beam failure recovery information and second beam failure recovery information; any bit in the first bitmap is used to indicate a beam failure detection result; at least a former of the first beam failure recovery information and the second beam failure recovery information is associated with the first bitmap; the first beam failure recovery information indicates a first candidate reference signal resource for the first beam failure recovery, the second beam failure recovery information indicates a second candidate reference signal resource for the second beam failure recovery; herein, the second message is a control signaling of a MAC layer; the first candidate reference signal resource and the second candidate reference signal resource are different.

In one embodiment, the first communication device 450 comprises at least one processor and at least one memory. a memory that stores a computer readable instruction program. The computer readable instruction program generates an action when executed by at least one processor. The action includes: evaluating first-type radio link quality according to a first reference signal set, whenever the evaluated first-type radio link quality is worse than a first threshold, a first counter being increased by 1, the first counter being greater than or equal to a first value being used to trigger a first beam failure recovery; evaluating second-type radio link quality according to a second reference signal set, whenever the evaluated second-type radio link quality is worse than a second threshold, a second counter being increased by 1, the second counter being greater than or equal to a second value being used to trigger a second beam failure recovery; the first reference signal set and the second reference signal set at least comprising one reference signal resource respectively; any reference signal resource in the first reference signal set and any reference signal resource in the second reference signal set being non-QCL; as a response to at least one of the first beam failure recovery or the second beam failure recovery being triggered, transmitting a second message; the second message comprising a first bitmap, first beam failure recovery information and second beam failure recovery information; any bit in the first bitmap being used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery; herein, the second message is a control signaling of a MAC layer; the first candidate reference signal resource and the second candidate reference signal resource are different.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first message, the first message is used to indicate a first reference signal set and a second reference signal set; a receiver of the first message, evaluates first-type radio link quality according to the first reference signal set, whenever the evaluated first-type radio link quality is worse than a first threshold, a first counter is increased by 1, the first counter being greater than or equal to a first value is used to trigger a first beam failure recovery; evaluates second-type radio link quality according to the second reference signal set, whenever the evaluated second-type radio link quality is worse than a second threshold, a second counter is increased by 1, the second counter being greater than or equal to a second value is used to trigger a second beam failure recovery; the first reference signal set and the second reference signal set respectively comprise at least one reference signal resource; any reference signal resource in the first reference signal set and any reference signal resource in the second reference signal set are non-QCL; receives a second message; and the second message comprises a first bitmap, first beam failure recovery information and second beam failure recovery information; any bit in the first bitmap is used to indicate a beam failure detection result; at least a former of the first beam failure recovery information and the second beam failure recovery information is associated with the first bitmap; the first beam failure recovery information indicates a first candidate reference signal resource for the first beam failure recovery, the second beam failure recovery information indicates a second candidate reference signal resource for the second beam failure recovery; herein, the second message is a control signaling of a MAC layer; the first candidate reference signal resource and the second candidate reference signal resource are different.

In one embodiment, the second communication device 410 comprises a memory that stores a computer readable instruction program. The computer readable instruction program generates an action when executed by at least one processor. The action includes: transmitting a first message, the first message being used to indicate a first reference signal set and a second reference signal set; a receiver of the first message, evaluating first-type radio link quality according to the first reference signal set, whenever the evaluated first-type radio link quality is worse than a first threshold, a first counter being increased by 1, the first counter being greater than or equal to a first value being used to trigger a first beam failure recovery; evaluating second-type radio link quality according to the second reference signal set, whenever the evaluated second-type radio link quality is worse than a second threshold, a second counter being increased by 1, the second counter being greater than or equal to a second value being used to trigger a second beam failure recovery; the first reference signal set and the second reference signal set at least comprising one reference signal resource respectively; any reference signal resource in the first reference signal set and any reference signal resource in the second reference signal set being non-QCL; receiving a second message; the second message comprising a first bitmap, first beam failure recovery information and second beam failure recovery information; any bit in the first bitmap being used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery; herein, the second message is a control signaling of a MAC layer; the first candidate reference signal resource and the second candidate reference signal resource are different.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a vehicle terminal.

In one embodiment, the first communication device 450 is a relay.

In one embodiment, the second communication device 410 is a base station.

In one embodiment, the receiver 456 (including the antenna 460), the receiving processor 452 and the controller/processor 490 are used to receive the first message in the present application.

In one embodiment, the receiver 456 (including the antenna 460), the receiving processor 452 and the controller/processor 490 are used to receive the first signaling in the present application.

In one embodiment, the transmitter 456 (including the antenna 460), the transmitting processor 455 and the controller/processor 490 are to transmit the second message in the present application.

In one embodiment, the transmitter 416 (including the antenna 420), the transmitting processor 412 and the controller/processor 440 are used to transmit the first message in the present application.

In one embodiment, the transmitter 416 (including the antenna 420), the transmitting processor 412 and the controller/processor 440 are used to transmit the first signaling in the present application.

In one embodiment, the receiver 416 (including the antenna 420), the receiving processor 412 and the controller/processor 440 are used to receive the second message in the present application.

Embodiment 5

Figure 5:
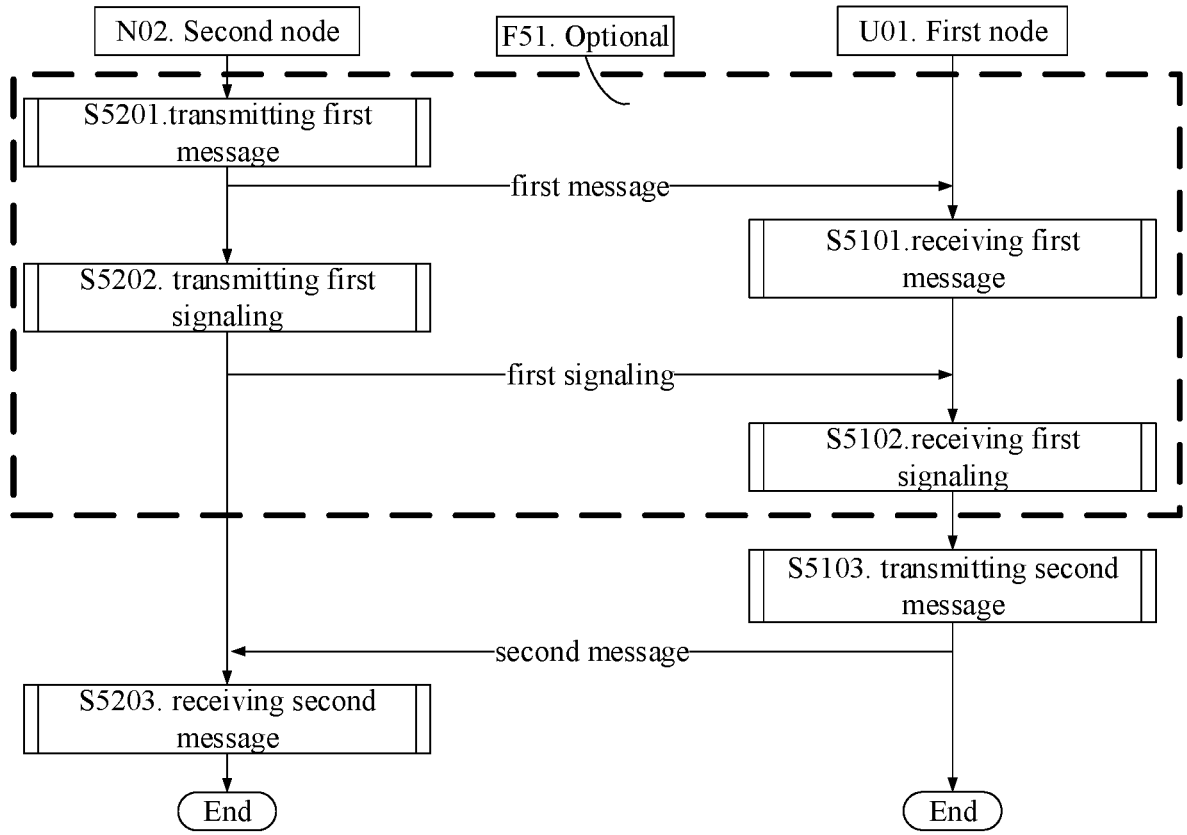
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, U01 corresponds to a first node in the present application, N02 corresponds to a second node in the present application. It is particularly underlined that the order illustrated in the embodiment does not put constraints over sequences of signal transmissions and implementations and steps in F51 are optional.

The first node U01 receives a first message in step S5101; receives a first signaling in step S5102; and transmits a second message in step S5103.

The second node N02 transmits a first message in step S5201; transmits a first signaling in step S5202; and receives a second message in step S5203.

In embodiment 5, the first node U01 evaluates first-type radio link quality according to a first reference signal set, whenever the evaluated first-type radio link quality is worse than a first threshold, a first counter is increased by 1, the first counter being greater than or equal to a first value is used to trigger a first beam failure recovery; evaluates second-type radio link quality according to a second reference signal set, whenever the evaluated second-type radio link quality is worse than a second threshold, a second counter is increased by 1, the second counter being greater than or equal to a second value is used to trigger a second beam failure recovery; the first reference signal set and the second reference signal set respectively comprise at least one reference signal resource; any reference signal resource in the first reference signal set and any reference signal resource in the second reference signal set is non-QCL;
  as a response to at least one of the first beam failure recovery or the second beam failure recovery being triggered, the first node U01 transmits a second message; the second message comprises a first bitmap, first beam failure recovery information and second beam failure recovery information; any bit in the first bitmap is used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery;
  herein, the second message is a control signaling of a MAC layer; the first candidate reference signal resource and the second candidate reference signal resource are different.

In one embodiment, the second node N02 is a serving cell of the first node U01.

In one embodiment, the second node N02 is a PCell of the first node U01.

In one embodiment, the second node N02 is an SpCell of the first node U01.

In one embodiment, the second node N02 configures transmission resources associated with a first PCI and a second PCI to the first node U01.

In one subembodiment of the above embodiment, the transmission resources are used to transmit data of user plane.

In one embodiment, the first message is transmitted by unicast.

In one embodiment, the first message is transmitted by broadcast or multicast.

In one embodiment, the first PCI is associated with an SSB of the second node N02.

In one embodiment, the first PCI is associated with an SS/PBCH of the second node N02.

In one embodiment, the second PCI is not associated with an SSB of the second node N02.

In one embodiment, the second PCI is not associated with an SS/PBCH of the second node N02.

In one embodiment, the first PCI is QCL with at least one of SSBs of the second node N02.

In one embodiment, the first PCI is QCL with at least one of SSs/PBCHs of the second node N02.

In one embodiment, the second PCI is not QCL with any of SSBs of the second node N02.

In one embodiment, the second PCI is not QCL with any of SSs/PBCHs of the second node N02.

In one embodiment, the first message comprises and only comprises an RRCReconfiguration.

In one embodiment, the first message comprises a candidateBeamRSSCellList.

In one embodiment, the first message comprises a candidateBeamRSSpCellList.

In one embodiment, the first message comprises a failureDetectionResourcesToAddModList.

In one embodiment, the first message comprises a candidateBeamRSList.

In one embodiment, the first message comprises a candidateBeamRSListExt.

In one embodiment, the first signaling comprises an RRC message.

In one embodiment, the first signaling comprises an RRCReconfiguration.

In one embodiment, the first signaling comprises an RRCSetup.

In one embodiment, the first signaling comprises an RRCResume.

In one embodiment, the first signaling comprises cellgroupconfig.

In one embodiment, a first signaling is received, the first signaling is used to configure a first cell group, a physCellId in ServingCellConfigCommon comprised in the first signaling is only used to indicate a former of the first PCI and the second PCI; a cell corresponding to any bit in the first bitmap belongs to the first cell group.

In one embodiment, the meaning of the phrase of a physCellId in ServingCellConfigCommon comprised in the first signaling only being used to indicate a former of the first PCI and the second PCI comprises that: the first PCI is a physCellId in ServingCellConfigCommon comprised in the first signaling; the second PCI is indicated by an identifier other than a physCellId in ServingCellConfigCommon comprised in the first signaling.

In one embodiment, the meaning of the phrase of a physCellId in ServingCellConfigCommon comprised in the first signaling only being used to indicate a former of the first PCI and the second PCI comprises that: the first PCI is indicated by a physCellId field of a first level of ServingCellConfigCommon comprised in the first signaling; the second PCI is indicated by an identifier other than an iphysCellId of a first level in ServingCellConfigCommon comprised in the first signaling.

In one subembodiment of the embodiment, the first level refers to directly comprising, and an n-th level, where n is a positive integer greater than 1, refers to be comprised by a comprised field.

In one subembodiment of the embodiment, the first level refers to a sub-item, and a second level refers to a sub-item of a sub-item, and so on.

In one subembodiment of the embodiment, the identifier other than a physCellId of first-level of ServingCellConfigCommon comprised in the first signaling comprises a physCellId of n-th level of ServingCellConfigCommon comprised in the first signaling, where n is a positive integer greater than 1.

In one embodiment, the first cell group is a cellgroup.

In one embodiment, the first cell group is a Master Cell Group (MCG) of the first node U01.

In one embodiment, the first cell group is a Secondary Cell Group (SCG) of the first node U01.

In one embodiment, the first signaling indicates that the first reference signal set is associated with the first PCI.

In one embodiment, the first signaling indicates that the second reference signal set is associated with the second PCI.

In one embodiment, any reference signal resource in the first reference signal set belongs to a cell identified by the first PCI.

In one embodiment, a cell identified by the first PCI executes a transmission of a signal in any reference signal resource in the first reference signal set.

In one embodiment, a cell identified by the second PCI executes a transmission of a signal in any reference signal resource in the second reference signal set.

In one embodiment, the first PCI is used to generate a reference signal transmitted on any reference signal resource in the first reference signal set.

In one embodiment, the second PCI is used to generate a reference signal transmitted on any reference signal resource in the second reference signal set.

In one embodiment, the first node U01 transmits the second message on allocated uplink resources.

In one embodiment, when uplink resources are insufficient, the first node U01 transmits a scheduling request, and the scheduling request is used to request allocating uplink resources.

In one subembodiment of the above embodiment, the scheduling request is transmitted on a Physical Uplink Control Channel (PUCCH) associated with the first PCI.

In one subembodiment of the above embodiment, the scheduling request is transmitted on a Physical Uplink Control Channel (PUCCH) associated with the second PCI.

In one subembodiment of the embodiment, the scheduling request is transmitted on a PUCCH associated with reference signal resources in which a beam failure is not detected.

In one subembodiment of the embodiment, the scheduling request is transmitted on a PUCCH associated with reference signal resources in which a beam failure is detected.

In one embodiment, the first beam failure recovery is for an SCell.

In one embodiment, the first beam failure recovery is for an SpCell.

In one embodiment, the second beam failure recovery is for an SCell.

In one embodiment, the second beam failure recovery is for an SpCell.

In one embodiment, reference signal resources in the first reference signal set used for detecting the first beam failure recovery belong to an SCell.

In one embodiment, reference signal resources in the first reference signal set used for detecting the first beam failure recovery belong to an SpCell.

In one embodiment, reference signal resources in the second reference signal set used for detecting the second beam failure recovery belong to an SCell.

In one embodiment, reference signal resources in the second reference signal set used for detecting the second beam failure recovery belong to an SpCell.

In one embodiment, the first beam failure recovery and the second beam failure recovery are for a same cell.

In one embodiment, the first beam failure recovery and the second beam failure recovery are for different cells.

In one embodiment, cells that the first beam failure recovery and the second beam failure recovery are for are identified by a same PCI.

In one embodiment, cells that the first beam failure recovery and the second beam failure recovery are for are identified by different PCIs.

In one embodiment, the first beam failure recovery and the second beam failure recovery are for different CCs.

In one embodiment, the first beam failure recovery and the second beam failure recovery are for different TRPs.

Embodiment 6

Figure 6:
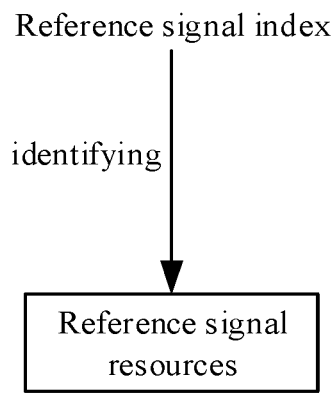
FIG. 6 illustrates a schematic diagram of a reference signal index identifying a reference signal resource according to one embodiment of the present application.

Embodiment 6 illustrates a schematic diagram of a reference signal index identifying reference signal resources according to one embodiment of the present application, as shown in FIG. 6.

In one embodiment, reference signal resources in FIG. 6 belong to the first reference signal set.

In one embodiment, reference signal resources in FIG. 6 belong to the second reference signal set.

In one embodiment, reference signal resources in FIG. 6 belong to the first candidate reference signal set.

In one embodiment, a reference signal index in FIG. 6 is any reference signal index in the first reference signal index set.

In one embodiment, a reference signal index in FIG. 6 is any reference signal index in the second reference signal index set.

In one embodiment, a reference signal index in FIG. 6 is any reference signal index in the first candidate reference signal index set.

In one embodiment, reference signal resources in FIG. 6 are reference signal resources identified by a reference signal index in the first reference signal index set.

In one embodiment, reference signal resources identified by a reference signal index in the first reference signal index set are reference signal resources in FIG. 6.

In one embodiment, reference signal resources in FIG. 6 are an SSB.

In one embodiment, reference signal resources in FIG. 6 are resources occupied by an SS/PBCH.

In one embodiment, reference signal resources in FIG. 6 are CSI-RS resources.

In one embodiment, reference signal resources in FIG. 6 are NZP-CSI-RS-Resource.

In one embodiment, reference signal resources in FIG. 6 are resources indicated by NZP-CSI-RS-Resource.

In one embodiment, reference signal resources in FIG. 6 are resources indicated by CSI-RS-ResourceMapping of NZP-CSI-RS-Resource.

In one embodiment, reference signal resources in FIG. 6 are NZP-CSI-RS-ResourceSet.

In one embodiment, any reference signal index comprised in the first reference signal index set is an index of an SSB.

In one embodiment, any reference signal index comprised in the first reference signal index set is an index of a csi-rs.

In one embodiment, any reference signal index comprised in the first reference signal index set is a ZP-CSI-RS-ResourceSetId.

In one embodiment, any reference signal index comprised in the first reference signal index set is a CSI-ResourceConfigId.

In one embodiment, any reference signal index comprised in the first reference signal index set is a CSI-SSB-ResourceSetId.

In one embodiment, any reference signal index comprised in the first reference signal index set is a CSI-IM-ResourceSetId.

In one embodiment, there exists a one-to-one corresponding relation between a reference signal index and the reference signal resource in FIG. 6.

In one embodiment, a serving cell of the first node is configured with reference signal resources and a reference signal index corresponding to the reference signal resources in FIG. 6.

In one embodiment, a serving cell of the first node is configured with a reference signal index and reference signal resources identified by the reference signal index in FIG. 6.

In one embodiment, a serving cell of the first node is configured with any reference signal index in the first reference signal index set and reference signal resources identified by the any reference signal index in the first reference signal index set.

In one embodiment, reference signal resources in FIG. 6 comprise time-domain resources.

In one embodiment, reference signal resources in FIG. 6 comprise frequency-domain resources.

In one embodiment, reference signal resources in FIG. 6 comprise spatial-domain resources.

Embodiment 7

Figure 7:
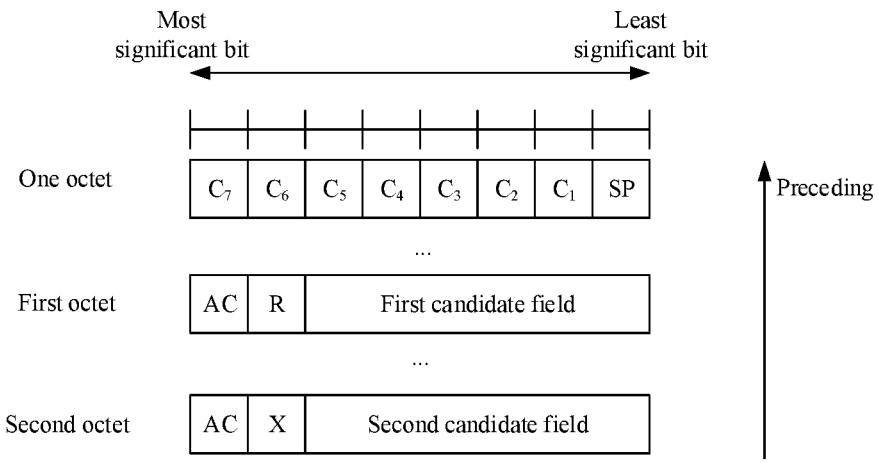
FIG. 7 illustrates a schematic diagram of a second message according to one embodiment of the present application.

Embodiment 7 illustrates a schematic diagram of a second message according to one embodiment of the present application, as shown in FIG. 7.

In one embodiment, the second message is a MAC CE.

In one embodiment, the second message comprises one or multiple octets, and each octet comprises 8 bits.

In one embodiment, the 8 bits comprised in an octet comprised in the second message are respectively $C_7$, $C_6$, $C_5$, $C_4$, $C_3$, $C_2$, $C_1$, $C_0$, SP, and each bit can also be considered as a field, for example, an SP bit can be called an SP field.

In one embodiment, first beam failure recovery information refers to a first octet or information carried by the first octet in FIG. 7.

In one embodiment, the second beam failure recovery information refers to a second octet or information carried by the second octet in FIG. 7.

In one embodiment, a most significant bit of the first octet is an AC field, a second most significant bit is an R field (a reserved field), and a first candidate field comprised in the first octet comprises 6 bits.

In one embodiment, a most significant bit of the second octet is an AC field, a second most significant bit is an X field, and a second candidate field comprised in the second octet comprises 6 bits.

In one embodiment, other octets may be comprised between the first octet and the one octet.

In one embodiment, other octets may be comprised between the first octet and the second octet.

In one embodiment, other octets can be comprised after the second octet.

In one embodiment, the first octet may also be after the second octet.

In one embodiment, the first bitmap is $C_7$, $C_6$, $C_5$, $C_4$, $C_3$, $C_2$, $C_1$ and $C_0$.

In one embodiment, the first bitmap is $C_7$, $C_6$, $C_5$, $C_4$, $C_3$, $C_2$, $C_1$, $C_0$ and SP.

In one embodiment, the first bitmap may also comprise bits of extra one or several octets.

In one embodiment, the first bitmap may also comprise more bits.

In one embodiment, the first bitmap comprises a first bit, the first bit corresponds to a first cell, the first bit is set to 1, and the first bit indicates the first beam failure recovery information; the first beam failure recovery information comprises a first octet; the first octet comprises a AC field set to 1 and a reserved field set to 0, and the AC field set to 1 indicates that the first octet also comprises a first candidate reference signal index; the reserved field set to 0 occupies a second most significant bit of the first octet; the second beam failure recovery information comprises a second octet; a second most significant bit of the second octet being set to 1 is used to indicate that the second beam failure recovery information is not indicated by any bit in the first bitmap; the first bitmap, the first octet and the second octet belong to a same MAC CE.

In one embodiment, the first cell belongs to the first cell group.

In one embodiment, the first bit is one of $C_7$, $C_6$, $C_5$, $C_4$, $C_3$, $C_2$, $C_1$ or $C_0$.

In one embodiment, the first bit is one of $C_7$, $C_6$, $C_5$, $C_4$, $C_3$, $C_2$, $C_1$, $C_0$ or SP.

In one embodiment, the first bit indicates an occurrence of the first octet comprising an AC field.

In one embodiment, the AC field of the first octet is set to 1 to indicate that a candidate beam evaluation for the first beam failure recovery has been completed.

In one embodiment, the AC field of the first octet is set to 1 to indicate an occurrence or existence of the first candidate field.

In one embodiment, the first candidate field is used to indicate the first candidate reference signal resource.

In one embodiment, the first candidate field indicates a first candidate reference signal index, and the first candidate reference signal index is used to identify the first candidate reference signal resource.

In one embodiment, the first candidate field indicates a first candidate reference signal index, and the first candidate reference signal index belongs to the first candidate reference signal index set.

In one embodiment, the first candidate field indicates a first candidate reference signal index, and the first candidate reference signal index belongs to the first candidate reference signal index subset.

In one embodiment, the first candidate reference signal index is a candidate RS ID.

In one embodiment, the R field of the first octet is set to 0.

In one embodiment, a second most significant bit of a second octet, that is, a value of X field, is set to 1.

In one embodiment, an AC field of a second octet is set to 1 to indicate that a candidate beam evaluation for the second beam failure recovery has been completed.

In one embodiment, an AC field of a second octet is set to 1 to indicate an occurrence or existence of the second candidate reference signal index.

In one embodiment, an AC field of a second octet is set to 1 to indicate that the second candidate field is set as a second candidate reference signal index.

In one embodiment, an AC field of a second octet is set to 1 to indicate 6 bits comprised in the second candidate field are not all 0.

In one embodiment, the second candidate field carries a second candidate reference signal index.

In one embodiment, the second candidate reference signal index is a candidate RS ID.

In one embodiment, the second candidate field is used to indicate the second candidate reference signal resource.

In one embodiment, the second candidate field indicates a second candidate reference signal index, and the second candidate reference signal index is used to identify the second candidate reference signal resource.

In one embodiment, the second candidate field indicates a second candidate reference signal index, and the second candidate reference signal index belongs to the second candidate reference signal index set.

In one embodiment, the second candidate field indicates a second candidate reference signal index, and the second candidate reference signal index belongs to the second candidate reference signal index subset.

In one embodiment, the first beam failure recovery information and the second beam failure recovery information are for a same cell.

In one embodiment, the first beam failure recovery information and the second beam failure recovery information are for different cells.

In one embodiment, any non-zero bit in the first bitmap corresponds to an octet comprising an AC field in the second message.

In one embodiment, the meaning of the phrase of a second most significant bit of the second octet being set to 1 to indicate that the second beam failure recovery information is not indicated by any bit in the first bitmap comprises: when a second most significant bit of the second octet is set to 1, any bit in the first bitmap does not indicate the second beam failure recovery information.

In one embodiment, the meaning of the phrase of a second most significant bit of the second octet being set to 1 to indicate that the second beam failure recovery information is not indicated by any bit in the first bitmap comprises: when a second most significant bit of the second octet is set to 1, there is no bit in the first bitmap indicating the second beam failure recovery information.

In one embodiment, the meaning of the phrase of a second most significant bit of the second octet being set to 1 to indicate that the second beam failure recovery information is not indicated by any bit in the first bitmap comprises: when a second most significant bit of the second octet is set to 1, any bit in the first bitmap is only used to indicate beam failure recovery information other than the second beam failure recovery information.

In one embodiment, the meaning of the phrase of a second most significant bit of the second octet being set to 1 to indicate that the second beam failure recovery information is not indicated by any bit in the first bitmap comprises: when a second most significant bit of the second octet is set to 1, any bit in the first bitmap is only used to indicate whether an octet comprising an AC field other than the second octet exists or occurs.

In one embodiment, the meaning of the phrase of a second most significant bit of the second octet being set to 1 to indicate that the second beam failure recovery information is not indicated by any bit in the first bitmap comprises: when a second most significant bit of the second octet is set to 1, whether the second octet exists or occurs is independent of the first bitmap.

In one embodiment, a second most significant bit of the second octet is always set to 1.

In one embodiment, an index of a logical channel ID of the second message is one of 50, 51, 314 or 315.

In one embodiment, the second reference signal set comprises only one reference signal resource.

In one embodiment, the second reference signal set only comprises two reference signal resources with a QCL relation.

In one embodiment, the advantage of the above method is that the second message can be extended on the basis of a BFR MAC CE or a Truncated BFR MAC CE without affecting a previous UE, achieving both forward and backward compatibility.

In one embodiment, the advantage of the above method is that the second message can reuse the existing logical channel identity, thereby reducing the complexity of management, configuration, UE algorithm and priority determination.

In one embodiment, the second beam failure recovery information comprises a second octet; the second beam failure recovery information comprises a AC field set to 0; the second beam failure recovery information comprises a second candidate reference signal index, the second candidate reference signal index is used to identify the second candidate reference signal resource for the second beam failure recovery; the second candidate reference signal index at least comprises a non-zero bit, the second candidate reference signal index occupies 6 least significant bits in the second octet, and 6 least significant bits in the second octet at least comprise a non-zero bit used to indicate the second candidate reference signal index; the AC field comprised in the second beam failure recovery information is not used to indicate the second candidate reference signal index;

the first beam failure recovery information comprises a AC field set to 1 and the AC field comprised in the first beam failure recovery information is used to indicate a first candidate reference signal index; the first candidate reference signal index is used to identify the first candidate reference signal resource for the first beam failure recovery.

In one subembodiment of one embodiment, a second most significant bit of the second octet is set to 0.

In one subembodiment of one embodiment, a second most significant bit of the second octet is set to 1.

In one embodiment, at least one of 6 bits occupied by the second candidate reference signal index is non-zero.

In one embodiment, a serving cell of the first node, that is, a receiver of the second message, determines whether the second candidate field comprises the second candidate reference signal index by detecting whether there exists a non-zero bit in bits of the second candidate field. When there exists a non-zero bit in bits of the second candidate field, the second candidate field comprises the second candidate reference signal index; when there does not exist a non-zero bit in bits of the second candidate field, the second candidate field only comprises a reserved bit, and the second candidate field does not comprise the second candidate reference signal index.

In one embodiment, the meaning of the phrase of the AC field comprised in the second beam failure recovery information not being used to indicate the second candidate reference signal index comprises that whether the second candidate reference signal index is carried by the second message is independent of a value of an AC field of the second octet.

In one embodiment, a second most significant bit in the second octet indicates that the second beam failure recovery is for the second reference signal set.

In one embodiment, a second most significant bit in the second octet indicates that the second beam failure recovery information is for the second reference signal set.

In one embodiment, a second most significant bit in the second octet indicates that the second beam failure recovery information is for the second candidate reference signal subset.

In one embodiment, a second most significant bit in the second octet indicates that the second candidate reference signal index belongs to the second candidate reference signal index subset.

In one embodiment, a most significant bit in the second octet indicates that the second beam failure recovery is for the second reference signal set.

In one embodiment, a most significant bit in the second octet indicates that the second beam failure recovery information is for the second reference signal set.

In one embodiment, a most significant bit in the second octet indicates that the second beam failure recovery information is for the second candidate reference signal subset.

In one embodiment, a most significant bit in the second octet indicates that the second candidate reference signal index belongs to the second candidate reference signal index subset.

In one embodiment, the advantages of the above method are that whether the second candidate field carries a candidate RS ID can be judged by directly detecting whether the second candidate field comprises a non-zero bit, in this way, a most significant bit or a AC field and/or a second most significant bit of the second octet can be used to transmit other information, thereby carrying more information, such as information specific to supporting M-TRP.

In one embodiment, the second octet is preceded by the first octet, and the second beam failure recovery information is for an SpCell.

In one embodiment, the advantage of the above method is that when the second message is the truncated MAC CE, SpCell-related beam failure recovery information can be transmitted relatively and preferentially, which is conducive to ensuring the communication quality of SpCell.

Embodiment 8

Figure 8:
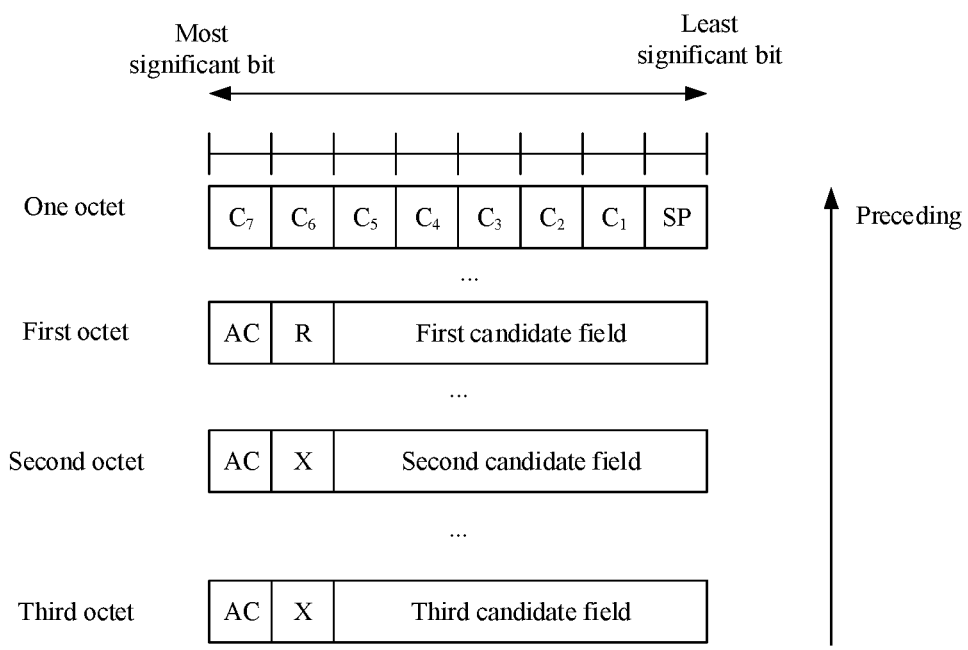
FIG. 8 illustrates a schematic diagram of a second message according to one embodiment of the present application.

Embodiment 8 illustrates a schematic diagram of a second message according to one embodiment of the present application, as shown in FIG. 8.

In one embodiment, the second message is a MAC CE.

In one embodiment, the second message comprises one or multiple octets, and each octet comprises 8 bits.

In one embodiment, 8 bits comprised in an octet comprised in the second message are respectively $C_7$, $C_6$, $C_5$, $C_4$, $C_3$, $C_2$, $C_1$, $C_0$ and SP, and each bit can also be considered as a field, for example, an SP bit can be called an SP field.

In one embodiment, first beam failure recovery information refers to a first octet or information carried by the first octet in FIG. 8.

In one embodiment, the second beam failure recovery information refers to a second octet or information carried by the second octet in FIG. 8.

In one embodiment, third beam failure recovery information refers to a third octet or information carried by the third octet in FIG. 8.

In one embodiment, a most significant bit of the first octet is an AC field, a second most significant bit is an R field (a reserved field), and a first candidate field comprised in the first octet comprises 6 bits.

In one embodiment, a most significant bit of the second octet is an AC field, a second most significant bit is an X field, and a second candidate field comprised in the second octet comprises 6 bits.

In one embodiment, a most significant bit of the third octet is an AC field, a second most significant bit is an X field, and a third candidate field comprised in the third octet comprises 6 bits.

In one embodiment, other octets may be comprised between the first octet and the one octet.

In one embodiment, other octets may be comprised between the first octet and the second octet.

In one embodiment, other octets may be comprised between the third octet and the second octet.

In one embodiment, other octets can be comprised after the third octet.

In one embodiment, the first octet can be after the second octet.

In one embodiment, a relationship among the first octet, the second octet and the third octet is arbitrary.

In one embodiment, the first bitmap is $C_7$, $C_6$, $C_5$, $C_4$, $C_3$, $C_2$, $C_1$ and $C_0$.

In one embodiment, the first bitmap is $C_7$, $C_6$, $C_5$, $C_4$, $C_3$, $C_2$, $C_1$, $C_0$ and SP.

In one embodiment, the first bitmap may also comprise bits of extra one or several octets.

In one embodiment, the first bitmap may also comprise more bits.

In one embodiment, an index of a logical channel ID of the second message is one of 50, 51, 314 or 315.

In one embodiment, an index of a logical channel ID of the second message is a value other than 50, 51, 314 and 315.

In one embodiment, the first node evaluates third-type radio link quality according to reference signal resources in the second reference signal set; whenever the evaluated third-type radio link quality is worse than a third threshold, a third counter is increased by 1; as a response to the third counter being greater than or equal to a third value, a third beam failure recovery is triggered;

the second beam failure recovery and the third beam failure recovery are respectively for a second cell and a third cell; the first bitmap comprises a bit respectively corresponding to an index of the second cell and an index of the third cell; whether the second message comprises third beam failure recovery information is used to determine whether a bit in the first bitmap corresponding to an index of the second cell is set to 1; the third beam failure recovery information is beam failure recovery information for the third beam failure recovery;

the meaning of the phrase of whether the second message comprises third beam failure recovery information being used to determine whether a bit in the first bitmap corresponding to an index of the second cell is set to 1 comprises:

when the second message comprises the third beam failure recovery information, whether a bit in the first bitmap corresponding to an index of the second cell is set to 1 is unrelated to both the second beam failure recovery information and the third beam failure recovery information;

when the second message does not comprise the third beam failure recovery information, a bit in the first bitmap corresponding to an index of the second cell is set to 1;

a bit in the first bitmap corresponding to an index of the second cell being set to 1 is used to indicate beam failure recovery information of the second cell.

In one embodiment, the third threshold is Qout_LR.

In one embodiment, the third threshold is determined by receiving quality of a PDCCH.

In one embodiment, the third threshold corresponds to RSRP of a radio link when a BLER of an assumed PDCCH is 10%.

In one embodiment, the third threshold corresponds to radio link observation quality or the third-type radio link quality when a BLER of a PDCCH is 10%.

In one embodiment, the third threshold corresponds to radio link quality or the third-type radio link quality when a BLER of an assumed PDCCH is 10%.

In one subembodiment of the above embodiment, assuming that a PDCCH is transmitted on reference signal resources of the second reference signal set, a measured or theoretical result of reference signal resources of the second reference signal set when reception quality of the PDCCH is BLER equal to 10% is the third threshold value.

In one subembodiment of the above embodiment, when a measured result of reference signal resources in the second reference signal set is the third threshold value, a PDCCH is transmitted on reference signal resources of the second reference signal set, then a BLER of the transmitted PDCCH is equal to 10%.

In one subembodiment of the above embodiment, assuming that a PDCCH is transmitted on a resource block to which reference signal resources of the second reference signal set belong, then a measured or theoretical result of reference signal resources when reception quality of the PDCCH is BLER equal to 10% is the third threshold value.

In one subembodiment of the above embodiment, when a measured result of reference signal resources in the second reference signal set is the third threshold value, a PDCCH is transmitted on a resource block to which reference signal resources of the second reference signal set belong, then a BLER of the transmitted PDCCH is equal to 10%.

In one subembodiment of the above embodiment, the third threshold is an observed or theoretical result of reference signal resources in the second reference signal set determined by a hypothetical experiment for reception quality of a PDCCH channel, where the reception quality of the PDCCH channel is BLER equal to 10%.

In one embodiment, the third threshold is RSRP, and the third-type radio link quality is RSRP of reference signal resources of the second reference signal set.

In one subembodiment of the embodiment, RSRP of reference signal resources of the second reference signal set is a measurement result on reference signal resources of the second reference signal set.

In one subembodiment of the embodiment, RSRP of one or all reference signal resources of the second reference signal set is an evaluation result on reference signal resources of the second reference signal set.

In one embodiment, the definition of the third threshold is a level at which a downlink at which a downlink radio link under a given resource configuration in the second reference signal set cannot be reliably received, and the reliable reception refers to transmission quality corresponding to the assumed PDCCH transmission experiment when BLER is equal to 10%.

In one embodiment, the third-type radio link quality is a best one of measurement results on all reference signal resources comprised in the second reference signal set.

In one embodiment, the third-type radio link quality is a best one of L1-RSRP measurement results on all reference signal resources comprised in the first reference signal set.

In one embodiment, the third-type radio link quality is a worst one of measurement results on all reference signal resources comprised in the second reference signal set.

In one embodiment, the third-type radio link quality is an average value of measurement results on all reference signal resources comprised in the second reference signal set.

In one embodiment, the third-type radio link quality is a measurement result on a reference signal resource comprised in the second reference signal set.

In one embodiment, the behavior of evaluating third-type radio link quality according to a second reference signal set comprises measuring channel quality of reference signal resources of the second reference signal set to obtain the third-type radio link quality.

In one embodiment, the behavior of evaluating third-type radio link quality according to a second reference signal set comprises determining PDCCH channel reception quality in the PDCCH transmission hypothesis test according to a resource configuration of the second reference signal set.

In one embodiment, the behavior of evaluating third-type radio link quality according to a second reference signal set comprises determining whether a downlink radio signal can be reliably received according to reference signal resources in the second reference signal set.

In one embodiment, the behavior of evaluating third-type radio link quality according to a second reference signal set comprises determining whether a downlink radio signal can be reliably received according to a configuration of reference signal resources in the second reference signal set.

In one embodiment, the behavior of evaluating third-type radio link quality according to a second reference signal set comprises performing a radio channel measurement according to a configuration of reference signal resources in the second reference signal set to determine whether a downlink radio signal can be reliably received.

In one embodiment, the third counter is BFI_COUNTER

In one embodiment, a name of the third counter comprises a BFI.

In one embodiment, the third value is configurable.

In one embodiment, the third value is configured by a serving cell of the first node.

In one embodiment, the first message indicates the third value.

In one embodiment, the third value is a beamFailureInstanceMaxCount.

In one embodiment, the third beam failure recovery is a BFR.

In one embodiment, the third beam failure recovery belongs to or comprises a BFR.

In one embodiment, the third beam failure recovery is a procedure used for a beam failure recovery.

In one embodiment, the third beam failure recovery is a procedure used for determining a new available beam.

In one embodiment, the third beam failure recovery and the second beam failure recovery are respectively triggered by evaluating different reference signal resources in the second reference signal set.

In one embodiment, a $C_i$ bit in the first bitmap corresponds to an index of the second cell, and a $C_j$ bit corresponds to an index of the third cell.

In one embodiment, the beam failure recovery information is an octet comprising an AC field.

In one embodiment, the beam failure recovery information is an octet comprising an AC field and indicating a candidate reference signal index.

In one embodiment, the beam failure recovery information is an octet comprising an AC field and a candidate RS ID.

In one embodiment, the first beam failure recovery information belongs to the beam failure recovery information.

In one embodiment, the second beam failure recovery information belongs to the beam failure recovery information.

In one embodiment, the third beam failure recovery information belongs to the beam failure recovery information.

In one embodiment, a third candidate field in the third octet is used to carry the third candidate reference signal index, and the third candidate reference signal index belongs to a second candidate reference signal index subset.

In one embodiment, reference signal resources identified by the third candidate reference signal index belong to the second candidate reference signal subset.

In one embodiment, the first beam failure recovery is for a first cell, and a bit in the first bitmap corresponding to an index of the first cell is a bit other than a $C_i$ bit in the first bitmap and a $C_j$ bit in the first bitmap.

In one embodiment, the meaning of the phrase of when the second message comprises the third beam failure recovery information, whether a bit in the first bitmap corresponding to an index of the second cell is set to 1 being unrelated to both the second beam failure recovery information and the third beam failure recovery information comprises: the second message comprises the third octet and the second octet, and whether the $C_i$ bit and the $C_j$ bit in the first bitmap are 1 is only determined by beam failure recovery information other than the second beam failure recovery information and the third beam failure recovery information.

In one embodiment, the meaning of the phrase of when the second message comprises the third beam failure recovery information, whether a bit in the first bitmap corresponding to an index of the second cell is set to 1 being unrelated to both the second beam failure recovery information and the third beam failure recovery information comprises: the second message comprises the third octet and the second octet, when there exists beam failure recovery information other than the second beam failure recovery information in the second cell, the $C_i$ bit in the first bitmap is set to 1; when there does not exist beam failure recovery information other than the second beam failure recovery information in the second cell, the $C_i$ bit in the first bitmap is set to 0; when there exists beam failure recovery information other than the third beam failure recovery information in the third cell, the $C_j$ bit in the first bitmap is set to 1; when there does not exist beam failure recovery information other than the third beam failure recovery information in the third cell, the $C_j$ bit in the first bitmap is set to 0.

In one embodiment, the meaning of the phrase of when the second message comprises the third beam failure recovery information, whether a bit in the first bitmap corresponding to an index of the second cell set is to 1 being unrelated to both the second beam failure recovery information and the third beam failure recovery information comprises: the second message comprises the third octet and the second octet, when there exists beam failure recovery other than the second beam failure recovery in the second cell, the $C_i$ bit in the first bitmap is set to 1; when there does not exist beam failure recovery other than the second beam failure recovery in the second cell, the $C_i$ bit in the first bitmap is set to 0; when there exists beam failure recovery other than the third beam failure recovery in the third cell, the $C_j$ bit in the first bitmap is set to 1; when there does not exist beam failure recovery other than the third beam failure recovery in the third cell, the $C_j$ bit in the first bitmap is set to 0;

In one embodiment, the meaning of the phrase of when the second message comprises the third beam failure recovery information, whether a bit in the first bitmap corresponding to an index of the second cell is set to 1 being unrelated to both the second beam failure recovery information and the third beam failure recovery information comprises: the second message comprises the third octet and the second octet, and whether the $C_i$ bit in the first bitmap is 1 is only related to whether the beam failure is evaluated or detected according to reference signal resources of the second cell in the first reference signal set; whether the $C_j$ bit in the first bitmap is 1 is only related to whether the beam failure is evaluated or detected according to reference signal resources of the third cell in the first reference signal set.

In one embodiment, when the second message does not comprise the third beam failure recovery information, a bit in the first bitmap corresponding to an index of the second cell is set to 1.

In one embodiment, when the second message does not comprise the third beam failure recovery information, an occurrence or existence of the second beam failure recovery information is used to determine that a bit in the first bitmap corresponding to an index of the second cell is set to 1.

In one embodiment, the advantages of the above method are that the second message can comprise two beam failure recovery information determined according to the second reference signal set, and can continue to ensure compatibility with the previous version, that is, whether the UE of the previous version or the new version uses the second message defined in this application can complete the reporting of beam failure recovery information without causing trouble to the base station.

In one embodiment, a bit in the first bitmap corresponding to an index of the second cell being set to 1 is used to indicate an occurrence or existence of beam failure recovery information of the second cell.

Embodiment 9

Figure 9:
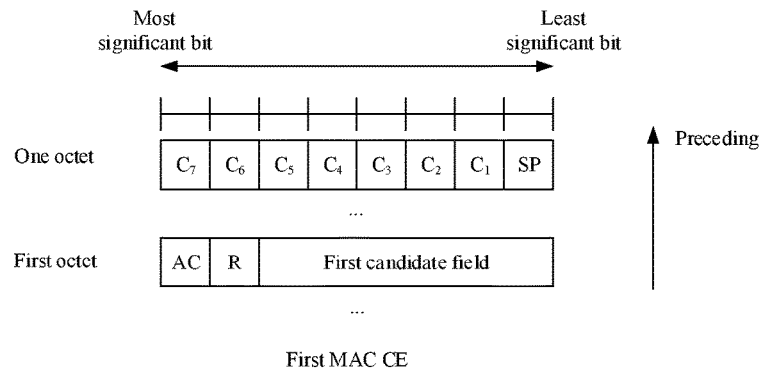
FIG. 9 illustrates a schematic diagram of a second message according to one embodiment of the present application.
Figure 9:
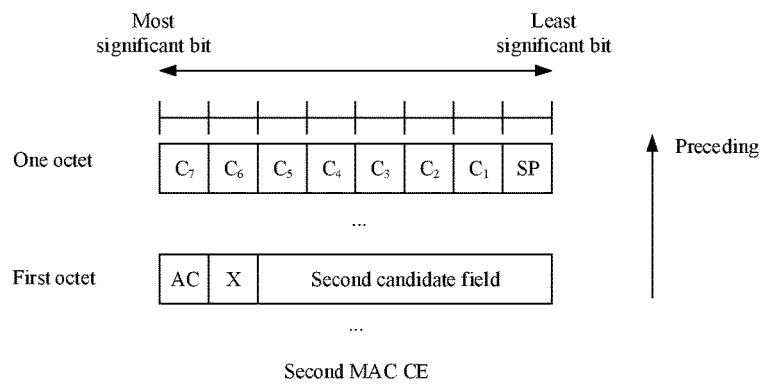

Embodiment 9 illustrates a schematic diagram of a second message according to one embodiment of the present application, as shown in FIG. 9.

In one embodiment, the second message comprises a first MAC CE and a second MAC CE, the first MAC CE comprises the first beam failure recovery information, and the second MAC CE comprises the second beam failure recovery information;
  the first MAC CE only comprises beam failure recovery information of a beam failure recovery determined or triggered according to radio link quality evaluated by reference signal resources in the first reference signal set;
  the second MAC CE only comprises beam failure recovery information of a beam failure recovery determined or triggered according to radio link quality evaluated by reference signal resources in the second reference signal set.

In one embodiment, the first MAC CE comprises one or multiple octets, and each octet comprises 8 bits.

In one embodiment, 8 bits comprised in an octet comprised in the first MAC CE are respectively $C_7$, $C_6$, $C_5$, $C_4$, $C_3$, $C_2$, $C_1$, $C_0$ and SP, and each bit can also be considered as a field, for example, an SP bit can be called an SP field.

In one embodiment, the first beam failure recovery information refers to a first octet of a first MAC CE or information carried by the first octet in FIG. 9.

In one embodiment, a most significant bit of the first octet of the first MAC CE is an AC field, a second most significant bit is an R field (a reserved field), and a first candidate field comprised in the first octet comprises 6 bits.

In one embodiment, other bits may be comprised in the first octet of the first MAC CE and the octet of the first MAC CE.

In one embodiment, the first bitmap comprises a first sub-bitmap and a second sub-bitmap.

In one embodiment, the first sub-bitmap is $C_7$, $C_6$, $C_5$, $C_4$, $C_3$, $C_2$, $C_1$ and $C_0$ in the octet of the first MAC CE.

In one embodiment, the first sub-bitmap is $C_7$, $C_6$, $C_5$, $C_4$, $C_3$, $C_2$, $C_1$, $C_0$ and SP in the octet of the first MAC CE.

In one embodiment, the first sub-bitmap may also comprise bits of extra one or several octets.

In one embodiment, the first sub-bitmap may also comprise more bits.

In one embodiment, the second MAC CE comprises one or multiple octets, and each octet comprises 8 bits.

In one embodiment, 8 bits comprised in an octet comprised in the second MAC CE are respectively $C_7$, $C_6$, $C_5$, $C_4$, $C_3$, $C_2$, $C_1$, $C_0$ and SP, and each bit can also be considered as a field, for example, an SP bit can be called an SP field.

In one embodiment, the second beam failure recovery information refers to a second octet of a second MAC CE or information carried by the second octet in FIG. 9.

In one embodiment, a most significant bit of the second octet of the second MAC CE is an AC field, a second most significant bit is an X field, and a second candidate field comprised in the second octet comprises 6 bits.

In one embodiment, other bits may be comprised in the second octet of the second MAC CE and the octet of the second MAC CE.

In one embodiment, the second sub-bitmap is $C_7$, $C_6$, $C_5$, $C_4$, $C_3$, $C_2$, $C_1$ and $C_0$ in the octet of the second MAC CE.

In one embodiment, the second sub-bitmap is $C_7$, $C_6$, $C_5$, $C_4$, $C_3$, $C_2$, $C_1$, $C_0$ and SP in the octet of the second MAC CE.

In one embodiment, the second sub-bitmap may also comprise bits of extra one or several octets.

In one embodiment, the second sub-bitmap may also comprise more bits.

In one embodiment, bits in the first sub-bitmap only indicates the first beam failure recovery information.

In one embodiment, bits in the second sub-bitmap only indicates the second beam failure recovery information.

In one embodiment, any bit in the first sub-bitmap being 1 is used to indicate that an octet comprising an AC field exists or occurs or may exist or may occur in the first MAC CE.

In one embodiment, any bit in the second sub-bitmap being 1 is used to indicate that an octet comprising an AC field exists or occurs or may exist or may occur in the second MAC CE.

In one embodiment, values of fields with a same name in the first MAC CE and the second MAC CE may the same or different.

In one embodiment, a first signaling is received, the first signaling is used to configure a first cell group, a physCellId in ServingCellConfigCommon comprised in the first signaling is only used to indicate a former of the first PCI and the second PCI; a cell corresponding to any bit in the first bitmap belongs to the first cell group;
the first reference signal set is associated with the first PCI; the second reference signal set is associated with the second PCI;
when uplink resources cannot carry all beam failure recovery information, the first MAC CE is transmitted preferentially.

In one embodiment, the first PCI is indicated by a physCellId subitem of a first level of the ServingCellConfigCommon comprised in the first signaling.

In one embodiment, the second PCI is indicated by a physCellId subitem of a second or a deeper level of the ServingCellConfigCommon comprised in the first signaling.

In one embodiment, the first PCI is a PCI associated with a selected SSB during cell selection or cell access procedure.

In one embodiment, the first PCI is a PCI associated with a selected cell-defining SSB during cell selection or cell access procedure.

In one embodiment, the second PCI is not a PCI associated with a selected SSB during cell selection or cell access procedure.

In one embodiment, the second PCI is not a PCI associated with a selected cell-defining SSB during cell selection or cell access procedure.

In one embodiment, the uplink resources are UL-SCH resources.

In one embodiment, an index of a logical channel ID corresponding to the first MAC CE is one of 50, 51, 314 or 315.

In one embodiment, indexes of logical channel IDs respectively corresponding to the first MAC CE and the second MAC CE are different.

In one embodiment, an index of a logical channel ID corresponding to the second MAC CE is one of 50, 51, 314 or 315.

In one embodiment, an index of a logical channel ID corresponding to the second MAC CE is a value other than 50, 51, 314 and 315.

In one embodiment, a logical channel ID in the present application comprises a LCID and an eLCID.

In one embodiment, the first MAC CE is the first-type MAC CE or a third-type MAC CE.

In one embodiment, the first MAC CE is the second-type MAC CE or a fourth-type MAC CE.

In one embodiment, when uplink resources are only sufficient to transmit one of the first MAC CE and the second MAC CE, the first MAC CE is preferentially transmitted.

In one embodiment, when uplink resources are only sufficient to transmit one of the first MAC CE and the second MAC CE, the first MAC CE is preferentially transmitted.

In one embodiment, when uplink resources are only sufficient to transmit the first-type MAC CE and a truncated second MAC CE, or only sufficient to transmit the second-type MAC CE or a complete second MAC CE, a first MAC CE transmitted by the first node belongs to the first-type MAC CE, and a second MAC CE transmitted by the first node is a truncated MAC CE.

In one embodiment, when uplink resources are only sufficient to transmit the third-type MAC CE and a truncated second MAC CE, or only sufficient to transmit the fourth-type MAC CE or a complete second MAC CE, a first MAC CE transmitted by the first node belongs to the third-type MAC CE, and a second MAC CE transmitted by the first node is a truncated MAC CE.

In one embodiment, when uplink resources cannot carry all beam failure recovery information, the first MAC CE comprises as much beam failure recovery information as possible, and when there are still resources after satisfying a transmission of the first MAC CE, the second MAC CE is transmitted.

In one subembodiment of the embodiment, limited to uplink resources, the second MAC CE only comprises partial generated beam failure recovery information.

In one embodiment, the advantage of the above method is that it simplifies the algorithm, allowing easier fallback to the traditional configuration method with only one TRP, while when fallback is made, the same effects can be achieved as with the traditional UE, which helps to ensure fairness.

In one embodiment, when uplink resources cannot carry all beam failure recovery information, beam failure recovery information of an SpCell is transmitted preferentially.

In one embodiment, when the first MAC CE comprises beam failure recovery information of an SpCell and the second MAC CE does not comprise beam failure recovery information of an SpCell, the first MAC CE is preferentially transmitted.

In one embodiment, when the second MAC CE comprises beam failure recovery information of an SpCell and the first MAC CE does not comprise beam failure recovery information of an SpCell, the second MAC CE is preferentially transmitted.

In one embodiment, when uplink resources cannot carry all beam failure recovery information, the first MAC CE and the second MAC CE are transmitted at the same time, the first MAC CE comprises beam failure recovery information of an SpCell; the second MAC CE comprises beam failure recovery information of an SpCell; at least one of the first MAC CE or the second MAC CE only comprises beam failure recovery information of partial SCells and partial beam failure recovery information of an SCell.

In one embodiment, the advantage of the above method is that beam failure recovery information of an SpCell being transmitted preferentially is conducive to ensuring communications of the SpCell, so as to avoid radio link failure.

In one embodiment, the first MAC CE and the second MAC CE are not multiplexed within one MAC PDU.

In one embodiment, the first MAC CE and the second MAC CE are multiplexed within one MAC PDU.

In one embodiment, when uplink resources cannot carry all beam failure recovery information, beam failure information is equally distributed between the first MAC CE and the second MAC CE as much as possible.

Embodiment 10

Figure 10:
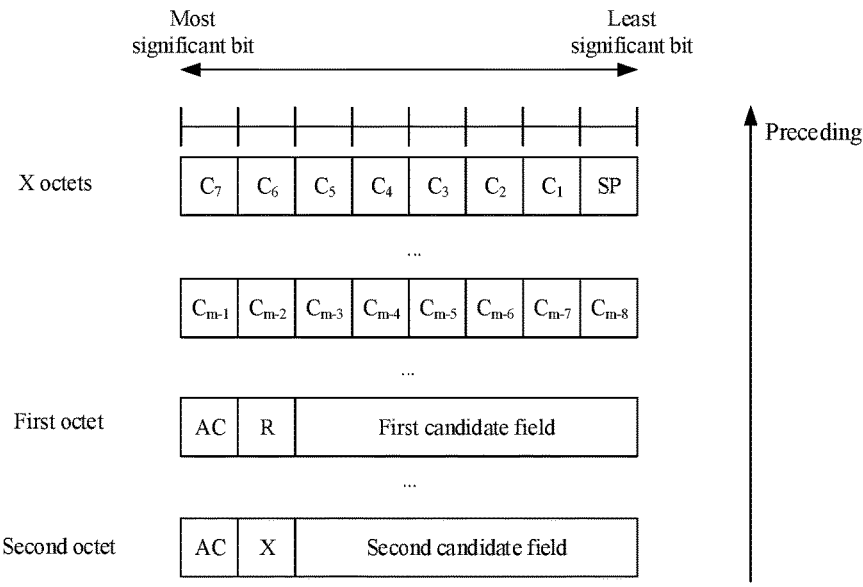
FIG. 10 illustrates a schematic diagram of a second message according to one embodiment of the present application.

Embodiment 10 illustrates a schematic diagram of a second message according to one embodiment of the present application, as shown in FIG. 10.

In one embodiment, the second message is a MAC CE.

In one embodiment, the second message comprises one or multiple octets, and each octet comprises 8 bits.

In one embodiment, 8 bits comprised in X octets comprised in the second message are respectively $C_{m-1}$, $C_{m-2}$, . . . , $C_3$, $C_2$, $C_1$, $C_0$ and SP, each bit can also be considered as a field, for example, an SP bit can be called an SP field.

In one embodiment, the X octets comprised in the second message may also comprise other fields.

In one embodiment, m is equal to one of 8, 16, 24, 32, 48 or 64.

In one embodiment, m is equal to one of 12, 20, 28, 36, 52 or 60.

In one embodiment, m is equal to one of 1, 2, 3, 4, 5, 6, 7 or 8.

In one embodiment, first beam failure recovery information refers to a first octet or information carried by the first octet in FIG. 10.

In one embodiment, the second beam failure recovery information refers to a second octet or information carried by the second octet in FIG. 10.

In one embodiment, a most significant bit of the first octet is an AC field, a second most significant bit is an R field (a reserved field), and a first candidate field comprised in the first octet comprises 6 bits.

In one embodiment, a most significant bit of the second octet is an AC field, a second most significant bit is an X field, and a second candidate field comprised in the second octet comprises 6 bits.

In one embodiment, other octets may be comprised between the first octet and X octets.

In one embodiment, other octets may be comprised between the first octet and the second octet.

In one embodiment, other octets may be comprised after the second octet.

In one embodiment, the first octet may be after the second octet.

In one embodiment, the first bitmap is $C_{m-1}$, $C_{m-2}$, . . . , $C_3$, $C_2$, $C_1$, $C_0$, and the first bitmap comprises m bits.

In one embodiment, the first bitmap is $C_{m-1}$, $C_{m-2}$, . . . , $C_3$, $C_2$, $C_1$, $C_0$ and SP, and the first bitmap comprises m+1 bits.

In one embodiment, the first bitmap comprises a first sub-bitmap and a second sub-bitmap, and the first sub-bitmap is used to indicate beam failure recovery information of a beam failure recovery determined according to radio link quality evaluated by reference signal resources in the first reference signal set;
the second sub-bitmap is used to indicate beam failure recovery information of a beam failure recovery determined according to radio link quality evaluated by reference signal resources in the second reference signal set.
herein, the first bitmap comprises K bit(s), the first sub-bitmap comprises K1 bit(s), the second sub-bitmap comprises K2 bit(s), and the first sub-bitmap and the second sub-bitmap are orthogonal; K, K1 and K2 are respectively positive integers.

In one subembodiment of the above embodiment, K is equal to m.

In one subembodiment of the above embodiment, K is equal to m+1.

In one embodiment, K1 and K2 are configurable.

In one embodiment, a sum of K1 and K2 is equal to K.

In one embodiment, the first sub-bitmap is consecutive K1 bits among the $C_{m-1}$, $C_{m-2}$, . . . , $C_3$, $C_2$, $C_1$, $C_0$.

In one embodiment, the second sub-bitmap is consecutive K2 bits among the $C_{m-1}$, $C_{m-2}$, . . . , $C_3$, $C_2$, $C_1$, $C_0$.

In one embodiment, a subscript belonging to the first sub-bitmap in the $C_{m-1}$, $C_{m-2}$, . . . , 0, $C_2$, $C_1$ and $C_0$ is less than a subscript belonging to the second sub-bitmap in the $C_{m-1}$, $C_{m-2}$, . . . , $C_3$, $C_2$, $C_1$ and $C_0$.

In one embodiment, one of K1 and K2 is implicitly configured, and the other one is explicitly indicated.

In one embodiment, advantages of the above method include that in a system supporting multiple TRPs, for example, a cell with two active TRPs, when the second message is or comprises a truncated MAC CE, it is possible ensure that each cell has one piece of beam failure recovery information (corresponding to a TRP) transmitted, which ensures that each cell can at least communicate, avoiding that some cells are recovered while others are interrupted.

In one embodiment, the second message comprises a fourth octet, a most significant bit and a second most significant bit of the fourth octet are set to 0, at least one of six least significant bits of the fourth octet is used to indicate whether a corresponding octet comprising an AC field exists or occurs, and the corresponding octet comprising the AC field is used to indicate a candidate reference signal identity or a candidate reference signal index.

In one embodiment, the advantages of the above method include that it can be extended based on the existing MAC CE without interfering with the processing of the UE of old version, and fewer MAC CE types are conducive to reducing the complexity of processing.

In one embodiment, the second message comprises a first field, and the first field is used to indicate a beam failure detection result of an SpCell; whether the second message belongs to a random access procedure is used to determine whether the first field indicates whether a beam failure is detected according to the first reference signal set or the second reference signal set of an SpCell.
when the second message is transmitted in a random access procedure, the first field indicates that a beam failure is detected according to reference signal resources associated with an SpCell in the first reference signal set, and a beam failure is also detected according to reference signal resources associated with an SpCell in the second reference signal set;

when the second message is transmitted outside a random access procedure, the first field indicates that a beam failure is detected according to one of reference signal resources associated with an SpCell in the first reference signal set and reference signal resources associated with an SpCell in the second reference signal set.

In one subembodiment of the embodiment, the first field is the SP field.

In one subembodiment of the embodiment, when the second message is transmitted other than a random access procedure, the first field indicates that a beam failure is evaluated or detected according to only a latter of reference signal resources associated with an SpCell in the first reference signal set and reference signal resources associated with an SpCell in the second reference signal set.

In one subembodiment of the embodiment, when the second message is transmitted in a random access procedure, the first field indicates that a beam failure is detected not only according to reference signal resources associated with an SpCell in the first reference signal set, but also according to reference signal resources associated with an SpCell in the second reference signal set.

In one embodiment, a message belonging to a random access procedure or being transmitted in a random access procedure refers to that the message is transmitted as MSG3.

In one embodiment, a message belonging to a random access procedure or being transmitted in a random access procedure refers to that the message is transmitted as MSGA.

In one embodiment, a message belonging to a random access procedure or being transmitted in a random access procedure refers to that the message is transmitted through resources indicated by an RAR message in the random access procedure.

In one embodiment, the second message belonging to a random access procedure or being transmitted in a random access procedure refers to that the second message is transmitted as MSG3.

In one embodiment, the second message belonging to a random access procedure or being transmitted in a random access procedure refers to that the second message is transmitted as MSGA.

In one embodiment, the second message belonging to a random access procedure or being transmitted in a random access procedure refers to that the second message is transmitted through resources indicated by an RAR message in the random access procedure.

In one embodiment, the advantage of the above method is that in the non-random access procedure, beam failure information related to SpCell can also be reported, especially beam failure recovery information of a certain TRP, which is conducive to a rapid recovery of the beam failure of the SpCell.

In one embodiment, beam failure recovery information of an SCell comprised in the first MAC CE is transmitted in priority to beam failure recovery information of an SCell comprised in the second MAC CE.

Embodiment 11

Figure 11:
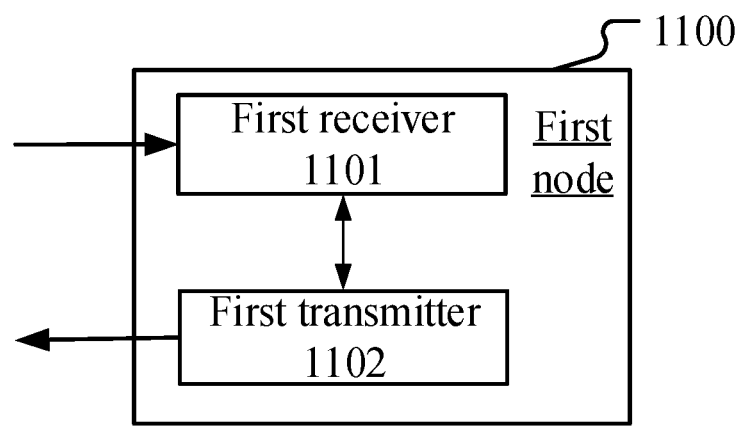
FIG. 11 illustrates a schematic diagram of a processor in a first node according to one embodiment of the present application.

Embodiment 11 illustrates a structure block diagram of a processor in a first node according to one embodiment of the present application, as shown in FIG. 11. In FIG. 11, a processor 1100 in a first node comprises a first receiver 1101 and a first transmitter 1102. In Embodiment 11, a first receiver 1101 evaluates first-type radio link quality according to a first reference signal set, whenever the evaluated first-type radio link quality is worse than a first threshold, a first counter is increased by 1, the first counter being greater than or equal to a first value is used to trigger a first beam failure recovery; evaluates second-type radio link quality according to a second reference signal set, whenever the evaluated second-type radio link quality is worse than a second threshold, a second counter is increased by 1, the second counter being greater than or equal to a second value is used to trigger a second beam failure recovery; the first reference signal set and the second reference signal set respectively comprise at least one reference signal resource; any reference signal resource in the first reference signal set and any reference signal resource in the second reference signal set are non-QCL;

the first transmitter 1102, as a response to at least one of the first beam failure recovery or the second beam failure recovery being triggered, transmits a second message; the second message comprises a first bitmap, first beam failure recovery information and second beam failure recovery information; any bit in the first bitmap is used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery;

herein, the second message is a control signaling of a MAC layer; the first candidate reference signal resource and the second candidate reference signal resource are different.

In one embodiment, the first bitmap comprises a first bit, the first bit corresponds to a first cell, the first bit is set to 1, and the first bit indicates the first beam failure recovery information; the first beam failure recovery information comprises a first octet; the first octet comprises a AC field set to 1 and a reserved field set to 0, and the AC field set to 1 indicates that the first octet also comprises a first candidate reference signal index; the reserved field set to 0 occupies a second most significant bit of the first octet; the second beam failure recovery information comprises a second octet; a second most significant bit of the second octet being set to 1 is used to indicate that the second beam failure recovery information is not indicated by any bit in the first bitmap; the first bitmap, the first octet and the second octet belong to a same MAC CE.

In one embodiment, the first receiver 1101 evaluates third-type radio link quality according to reference signal resources in the second reference signal set; whenever the evaluated third-type radio link quality is worse than a third threshold, a third counter is increased by 1; as a response to the third counter being greater than or equal to a third value, a third beam failure recovery is triggered;

the second beam failure recovery and the third beam failure recovery are respectively for a second cell and a third cell; the first bitmap comprises a bit respectively corresponding to an index of the second cell and an index of the third cell; whether the second message comprises third beam failure recovery information is used to determine whether a bit in the first bitmap corresponding to an index of the second cell is set to 1; the third beam failure recovery information is beam failure recovery information for the third beam failure recovery;

the meaning of the phrase of whether the second message comprises third beam failure recovery information being used to determine whether a bit in the first bitmap corresponding to an index of the second cell is set to 1 comprises: when the second message comprises the third beam failure recovery information, whether a bit in the first bitmap corresponding to an index of the second cell is set to 1 is unrelated to both the second beam failure recovery information and the third beam failure recovery information; when the second message does not comprise the third beam failure recovery information, a bit in the first bitmap corresponding to an index of the second cell is set to 1;

a bit in the first bitmap corresponding to an index of the second cell being set to 1 is used to indicate beam failure recovery information of the second cell.

In one embodiment, the second message comprises a first MAC CE and a second MAC CE, the first MAC CE comprises the first beam failure recovery information, and the second MAC CE comprises the second beam failure recovery information;

the first MAC CE only comprises beam failure recovery information of a beam failure recovery determined according to radio link quality evaluated by reference signal resources in the first reference signal set;

the second MAC CE only comprises beam failure recovery information of a beam failure recovery determined according to radio link quality evaluated by reference signal resources in the second reference signal set.

In one embodiment, the first receiver 1101 receives a first signaling, the first signaling is used to configure a first cell group, a physCellId in ServingCellConfigCommon comprised in the first signaling is only used to indicate a former of the first PCI and the second PCI; a cell corresponding to any bit in the first bitmap belongs to the first cell group;

the first reference signal set is associated with the first PCI; the second reference signal set is associated with the second PCI;

when uplink resources cannot carry all beam failure recovery information, the first MAC CE is transmitted preferentially.

In one embodiment, the first receiver 1101 receives a first signaling, the first signaling is used to configure the first cell group, a physCellId in ServingCellConfigCommon comprised in the first signaling is only used to indicate a former of the first PCI and the second PCI; a cell corresponding to any bit in the first bitmap belongs to the first cell group;

the first reference signal set is associated with the first PCI; the second reference signal set is associated with the second PCI;

when uplink resources cannot carry all beam failure recovery information, beam failure recovery information of an SpCell is transmitted preferentially.

In one embodiment, the second beam failure recovery information comprises a second octet; the second beam failure recovery information comprises a AC field set to 0; the second beam failure recovery information comprises a second candidate reference signal index, the second candidate reference signal index is used to identify the second candidate reference signal resource for the second beam failure recovery; the second candidate reference signal index at least comprises a non-zero bit, the second candidate reference signal index occupies 6 least significant bits in the second octet, and 6 least significant bits in the second octet at least comprise a non-zero bit used to indicate the second candidate reference signal index; the AC field comprised in the second beam failure recovery information is not used to indicate the second candidate reference signal index;

the first beam failure recovery information comprises a AC field set to 1 and the AC field comprised in the first beam failure recovery information is used to indicate a first candidate reference signal index; the first candidate reference signal index is used to identify the first candidate reference signal resource for the first beam failure recovery.

In one embodiment, the first bitmap comprises a first sub-bitmap and a second sub-bitmap, and the first sub-bitmap is used to indicate beam failure recovery information of a beam failure recovery determined according to radio link quality evaluated by reference signal resources in the first reference signal set;

the second sub-bitmap is used to determine beam failure recovery information of a beam failure recovery determined according to radio link quality evaluated by reference signal resources in the second reference signal set.

herein, the first bitmap comprises K bit(s), the first sub-bitmap comprises K1 bit(s), the second sub-bitmap comprises K2 bit(s), and the first sub-bitmap and the second sub-bitmap are orthogonal; K, K1 and K2 are respectively positive integers.

In one embodiment, the second message comprises a first field, and the first field is used to indicate a beam failure detection result of an SpCell; whether the second message belongs to a random access procedure is used to determine whether the first field indicates whether a beam failure is detected according to the first reference signal set or the second reference signal set of an SpCell;

when the second message is transmitted in a random access procedure, the first field indicates that a beam failure is detected according to reference signal resources associated with an SpCell in the first reference signal set, and a beam failure is also detected according to reference signal resources associated with an SpCell in the second reference signal set;

when the second message is transmitted outside a random access procedure, the first field indicates that a beam failure is detected according to one of reference signal resources associated with an SpCell in the first reference signal set and reference signal resources associated with an SpCell in the second reference signal set.

In one embodiment, the first node is a UE.

In one embodiment, the first node is a terminal that supports large latency differences.

In one embodiment, the first node is a terminal that supports NTN.

In one embodiment, the first node is an aircraft.

In one embodiment, the first node is a vehicle terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a device that supports transmission with low-latency and high-reliability.

In one embodiment, the first node is a sidelink communication node.

In one embodiment, the first receiver 1101 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1102 comprises at least one of the antenna 452, the transmitter 454, the transmitting processor 468, the multi-antenna transmitting processor 457, the controller/processor 459, the memory 460 or the data source 467 in Embodiment 4.

Embodiment 12

Figure 12:
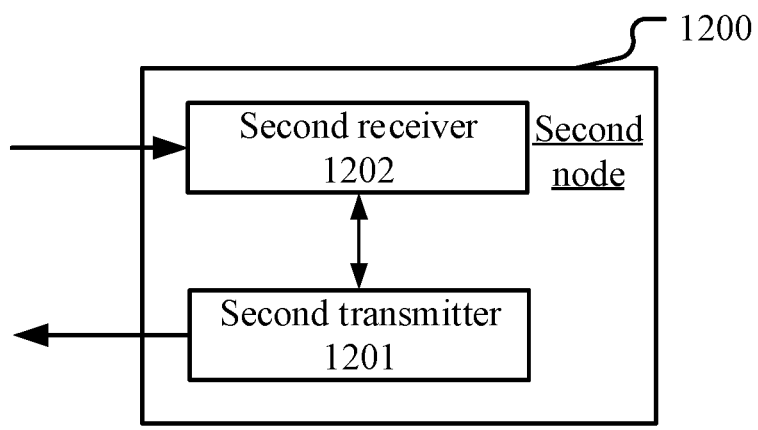
FIG. 12 illustrates a schematic diagram of a processor in a second node according to one embodiment of the present application.

Embodiment 12 illustrates a structure block diagram of a processor in a second node according to one embodiment of the present application, as shown in FIG. 12. In FIG. 12, a processor 1200 in a second node comprises a second transmitter 1201 and a second receiver 1202. In Embodiment 12,
- the second transmitter 1201, transmits a first message, the first message is used to indicate a first reference signal set and a second reference signal set;
- a receiver of the first message, evaluating first-type radio link quality according to the first reference signal set, whenever the evaluated first-type radio link quality is worse than a first threshold, a first counter being increased by 1, the first counter being greater than or equal to a first value being used to trigger a first beam failure recovery; evaluating second-type radio link quality according to the second reference signal set, whenever the evaluated second-type radio link quality is worse than a second threshold, a second counter being increased by 1, the second counter being greater than or equal to a second value being used to trigger a second beam failure recovery; the first reference signal set and the second reference signal set at least comprising one reference signal resource respectively; any reference signal resource in the first reference signal set and any reference signal resource in the second reference signal set being non-QCL;
- the second receiver 1202 receives a second message; the second message comprises a first bitmap, first beam failure recovery information and second beam failure recovery information; any bit in the first bitmap is used to indicate a beam failure detection result; at least a former of the first beam failure recovery information and the second beam failure recovery information being associated with the first bitmap; the first beam failure recovery information indicating a first candidate reference signal resource for the first beam failure recovery, the second beam failure recovery information indicating a second candidate reference signal resource for the second beam failure recovery;
- herein, the second message is a control signaling of a MAC layer; the first candidate reference signal resource and the second candidate reference signal resource are different.

In one embodiment, the first bitmap comprises a first bit, the first bit corresponds to a first cell, the first bit is set to 1, and the first bit indicates the first beam failure recovery information; the first beam failure recovery information comprises a first octet; the first octet comprises a AC field set to 1 and a reserved field set to 0, and the AC field set to 1 indicates that the first octet also comprises a first candidate reference signal index; the reserved field set to 0 occupies a second most significant bit of the first octet; the second beam failure recovery information comprises a second octet; a second most significant bit of the second octet being set to 1 is used to indicate that the second beam failure recovery information is not indicated by any bit in the first bitmap; the first bitmap, the first octet and the second octet belong to a same MAC CE.

In one embodiment, a receiver of the first message is a first node.

In one embodiment, the second message comprises a first MAC CE and a second MAC CE, the first MAC CE comprises the first beam failure recovery information, and the second MAC CE comprises the second beam failure recovery information;
- the first MAC CE only comprises beam failure recovery information of a beam failure recovery determined according to radio link quality evaluated by reference signal resources in the first reference signal set;
- the second MAC CE only comprises beam failure recovery information of a beam failure recovery determined according to radio link quality evaluated by reference signal resources in the second reference signal set.

In one embodiment, the second transmitter 1201 transmits a first signaling, the first signaling is used to configure a first cell group, a physCellId in ServingCellConfigCommon comprised in the first signaling is only used to indicate a former of the first PCI and the second PCI; a cell corresponding to any bit in the first bitmap belongs to the first cell group;
- the first reference signal set is associated with the first PCI; the second reference signal set is associated with the second PCI;
- when uplink resources cannot carry all beam failure recovery information, the first MAC CE is transmitted preferentially.

In one embodiment, the second transmitter 1201 transmits a first signaling, the first signaling is used to configure the first cell group, a physCellId in ServingCellConfigCommon comprised in the first signaling is only used to indicate a former of the first PCI and the second PCI; a cell corresponding to any bit in the first bitmap belongs to the first cell group;
- the first reference signal set is associated with the first PCI; the second reference signal set is associated with the second PCI;
- when uplink resources cannot carry all beam failure recovery information, beam failure recovery information of an SpCell is transmitted preferentially.

In one embodiment, the second beam failure recovery information comprises a second octet; the second beam failure recovery information comprises a AC field set to 0; the second beam failure recovery information comprises a second candidate reference signal index, the second candidate reference signal index is used to identify the second candidate reference signal resource for the second beam failure recovery; the second candidate reference signal index at least comprises a non-zero bit, the second candidate reference signal index occupies 6 least significant bits in the second octet, and 6 least significant bits in the second octet at least comprise a non-zero bit used to indicate the second candidate reference signal index; the AC field comprised in the second beam failure recovery information is not used to indicate the second candidate reference signal index;
- the first beam failure recovery information comprises a AC field set to 1 and the AC field comprised in the first beam failure recovery information is used to indicate a first candidate reference signal index; the first candidate reference signal index is used to identify the first candidate reference signal resource for the first beam failure recovery.

In one embodiment, the first bitmap comprises a first sub-bitmap and a second sub-bitmap, and the first sub-bitmap is used to indicate beam failure recovery information of a beam failure recovery determined according to radio link quality evaluated by reference signal resources in the first reference signal set;

the second sub-bitmap is used to determine beam failure recovery information of a beam failure recovery determined according to radio link quality evaluated by reference signal resources in the second reference signal set.

herein, the first bitmap comprises K bit(s), the first sub-bitmap comprises K1 bit(s), the second sub-bitmap comprises K2 bit(s), and the first sub-bitmap and the second sub-bitmap are orthogonal; K, K1 and K2 are respectively positive integers.

In one embodiment, the second message comprises a first field, and the first field is used to indicate a beam failure detection result of an SpCell; whether the second message belongs to a random access procedure is used to determine whether the first field indicates whether a beam failure is detected according to the first reference signal set or the second reference signal set of an SpCell;

when the second message is transmitted in a random access procedure, the first field indicates that a beam failure is detected according to reference signal resources associated with an SpCell in the first reference signal set, and a beam failure is also detected according to reference signal resources associated with an SpCell in the second reference signal set;

when the second message is transmitted outside a random access procedure, the first field indicates that a beam failure is detected according to one of reference signal resources associated with an SpCell in the first reference signal set and reference signal resources associated with an SpCell in the second reference signal set.

In one embodiment, the second node is a satellite.
In one embodiment, the second node is a base station.
In one embodiment, the second node is a relay.
In one embodiment, the second node is an access point.
In one embodiment, the second node is a node supporting multicast.

In one embodiment, the second transmitter 1201 comprises at least one of the antenna 420, the transmitter 418, the transmitting processor 416, the multi-antenna transmitting processor 471, the controller/processor 475 or the memory 476 in Embodiment 4.

In one embodiment, the second receiver 1202 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets, satellite communication equipment, ship communication equipment, NTN user equipment and other wireless communication devices. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present application includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A User Equipment (UE) comprising:
a processor and a receiver configured to evaluate a first-type radio link quality associated with a first reference signal set, wherein, when the first-type radio link quality is worse than a first threshold, a first counter is increased, wherein a first beam failure recovery (BFR) is triggered when the first counter is greater than or equal to a first value;

the processor and the receiver configured to evaluate a second-type radio link quality associated with a second reference signal set, wherein, when the second-type radio link quality is worse than a second threshold, increase a second counter, wherein a second BFR is triggered when the second counter is greater than or equal to a second value, wherein the first reference signal set and the second reference signal set at least comprise one reference signal resource respectively, wherein any reference signal resource in the first reference signal set and any reference signal resource in the second reference signal set are not Quasi Co-Located (QCLed); and the processor and a transmitter configured to, in response to at least one of the first BFR or the second BFR being triggered, transmit a Medium Access Control (MAC) Control Element (MAC-CE) comprising a bitmap, first BFR information and second BFR information, wherein a bit in the bitmap indicates a beam failure detection result, wherein at least one of the first BFR information or the second BFR information is associated with the bitmap, wherein the first BFR information indicates a first candidate reference signal resource for the first BFR, and the second BFR information indicates a second candidate reference signal resource for the second BFR, wherein the first candidate reference signal resource and the second candidate reference signal resource are different, and wherein both the first BFR and the second BFR are associated with a Special Cell (SpCell) wherein a position of the second BFR information in the MAC-CE is related to whether a cell that the second BFR information is associated with belongs to an SpCell, and wherein a logical channel Identity (ID) of the MAC-CE identifies the MAC-CE as one of: a BFR one octet Ci MAC-CE, a Truncated BFR one octet Ci MAC-CE, a BFR four octets Ci MAC-CE, or a Truncated BFR four octets Ci MAC-CE.

2. The UE of claim 1, wherein the MAC-CE comprises one or more octets, each octet comprising 8 bits, wherein the first BFR information is associated with a first octet or information carried by the first octet, wherein the second BFR information is associated with a second octet or information carried by the second octet, wherein an AC field of the second octet is used to indicate an occurrence or existence of a second candidate reference signal index, wherein the AC field of the second octet is used to indicate that bits of a second candidate field are not all 0, wherein a second most significant bit of the second octet indicates that the second BFR is associated with the second reference signal set, wherein the second candidate field indicates a second candidate reference signal index, and wherein the second candidate reference signal index is used to identify the second candidate reference signal resource.

3. The UE of claim 2, wherein an AC field of the first octet is used to indicate an occurrence or existence of a first candidate field, wherein the first candidate field indicates a first candidate reference signal index, and wherein the first candidate reference signal index is used to identify the first candidate reference signal resource.

4. The UE of claim 3, wherein a most significant bit of the second octet is an AC field, wherein the second octet comprises the second candidate field, and wherein the second octet comprises 6 bits.

5. The UE of claim 3, wherein a second most significant bit of the second octet is set to 1.

6. The UE of claim 3,
wherein the processor and the receiver are configured to receive a signaling, the signaling being used to configure a cell group, wherein the signaling indicates one of a first Physical Cell Identifier (PCI) or a second PCI, wherein a cell corresponding to any bit in the first bitmap belongs to the cell group,
wherein the first reference signal set is associated with the first PCI, wherein the second reference signal set is associated with the second PCI.

7. The UE of claim 1, wherein the first reference signal set and the second reference signal set are respectively associated with different PCIs.

8. The UE of claim 7, wherein the first BFR and the second BFR are associated with a same cell.

9. The UE of claim 8, wherein a bit in the bitmap corresponding to a cell index of the same cell is set to 1.

10. The UE of claim 1, wherein the first BFR information is used to determine a value of a first at least one bit in the bitmap, wherein the second BFR information is used to determine a value of a second at least one bit in the bitmap, wherein any bit in the bitmap corresponds to a group of reference signal resources or an index of reference signal resources.

11. A method performed by a User Equipment (UE), the method comprising:
evaluating a first-type radio link quality associated with a first reference signal set, wherein, when the first-type radio link quality is worse than a first threshold, a first counter is increased, wherein a first beam failure recovery (BFR) is triggered when the first counter is greater than or equal to a first value;
evaluating a second-type radio link quality associated with a second reference signal set, wherein, when the second-type radio link quality is worse than a second threshold, increasing a second counter, wherein a second BFR is triggered when the second counter is greater than or equal to a second value, wherein the first reference signal set and the second reference signal set at least comprise one reference signal resource respectively, wherein any reference signal resource in the first reference signal set and any reference signal resource in the second reference signal set are not Quasi Co-Located (QCLed); and
in response to at least one of the first BFR or the second BFR being triggered, transmitting a Medium Access Control (MAC) Control Element (MAC-CE) comprising a bitmap, first BFR information, and second BFR information, wherein a bit in the bitmap indicates a beam failure detection result, wherein at least one of the first BFR information or the second BFR information is associated with the bitmap, wherein the first BFR information indicates a first candidate reference signal resource for the first BFR, and the second BFR information indicates a second candidate reference signal resource for the second BFR, wherein the first candidate reference signal resource and the second candidate reference signal resource are different, wherein both the first beam failure recovery and the second beam failure recovery are associated with a Special Cell (SpCell), wherein a position of the second beam failure recovery information in the MAC-CE is related to whether a cell that the second BFR information is associated with belongs to an SpCell, and wherein a logical channel Identity (ID) of the MAC-CE identifies the MAC-CE as one of: a BFR one octet Ci MAC-CE, a Truncated BFR one octet Ci MAC-CE, a BFR four octets Ci MAC-CE, or a Truncated BFR four octets Ci MAC-CE.

12. The method of claim 11, wherein the MAC-CE comprises one or more octets, each octet comprising 8 bits, wherein the first BFR information is associated with a first octet or information carried by the first octet, wherein the second BFR information is associated with a second octet or information carried by the second octet, wherein an AC field of the second octet is used to indicate an occurrence or existence of a second candidate reference signal index, wherein the AC field of the second octet is used to indicate that bits of a second candidate field are not all 0, wherein a second most significant bit of the second octet indicates that the second BFR is associated with the second reference signal set, wherein the second candidate field indicates a second candidate reference signal index, and wherein the second candidate reference signal index is used to identify the second candidate reference signal resource.

13. The method of claim 12, wherein an AC field of the first octet is used to indicate an occurrence or existence of a first candidate field, wherein the first candidate field indicates a first candidate reference signal index, and wherein the first candidate reference signal index is used to identify the first candidate reference signal resource.

14. The method of claim 13, wherein a most significant bit of the second octet is an AC field, wherein the second octet comprises the second candidate field, and wherein the second octet comprises 6 bits.

15. The method of claim 13, wherein a second most significant bit of the second octet is set to 1.

16. The method of claim 13, further comprising receiving a signaling, the signaling being used to configure a cell group, wherein the signaling indicates one of a first Physical Cell Identifier (PCI) or a second PCI, wherein a cell corresponding to any bit in the bitmap belongs to the cell group, wherein the first reference signal set is associated with the first PCI, and wherein the second reference signal set is associated with the second PCI.

17. The method of claim 11, wherein the first reference signal set and the second reference signal set are respectively associated with different PCIs.

18. The method of claim 17, wherein the first BFR and the second BFR are associated with a same cell.

19. The method of claim 18, wherein a bit in the bitmap corresponding to a cell index of the same cell is set to 1.

20. The method of claim 11, wherein the first BFR information is used to determine a value of a first at least one bit in the bitmap, wherein the second BFR information is used to determine a value of a second at least one bit in the bitmap, wherein any bit in the bitmap corresponds to a group of reference signal resources or an index of reference signal resources.

* * * * *